US009599188B2

(12) United States Patent
Dögel et al.

(10) Patent No.: US 9,599,188 B2
(45) Date of Patent: Mar. 21, 2017

(54) TORSIONAL VIBRATION DAMPER ASSEMBLY WITH SPEED-DEPENDENT CHARACTERISTICS

(71) Applicant: ZF FRIEDRICHSHAFEN AG, Friedrichshafen (DE)

(72) Inventors: Thomas Dögel, Nüdlingen (DE); Uwe Grossgebauer, Erlabrunn (DE); Andreas Orlamünder, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 41 days.

(21) Appl. No.: 14/436,850

(22) PCT Filed: Oct. 14, 2013

(86) PCT No.: PCT/EP2013/071417
§ 371 (c)(1),
(2) Date: Apr. 17, 2015

(87) PCT Pub. No.: WO2014/060349
PCT Pub. Date: Apr. 24, 2014

(65) Prior Publication Data
US 2016/0186835 A1  Jun. 30, 2016

(30) Foreign Application Priority Data

Oct. 17, 2012 (DE) .................. 10 2012 218 918

(51) Int. Cl.
*F16F 15/14* (2006.01)
*F16F 15/12* (2006.01)
(Continued)

(52) U.S. Cl.
CPC ...... *F16F 15/1421* (2013.01); *F16F 15/1202* (2013.01); *F16F 15/123* (2013.01); *F16F 15/1215* (2013.01)

(58) Field of Classification Search
CPC ............... F16F 15/1421; F16F 15/1202; F16F 15/13128; F16F 15/1336; F16F 15/1215; F16F 15/123; Y10T 74/2131
See application file for complete search history.

(56) References Cited

U.S. PATENT DOCUMENTS

2009/0221376 A1    9/2009  Movlazada

FOREIGN PATENT DOCUMENTS

DE    30 23 300    2/1981
DE    198 12 303   9/1999
(Continued)

*Primary Examiner* — Thomas Diaz
(74) *Attorney, Agent, or Firm* — Cozen O'Connor

(57) ABSTRACT

A torsional vibration damping arrangement for a drivetrain of a vehicle includes a carrier arrangement that is rotatable around an axis of rotation, a deflection mass movable in a circumferential direction relative to the carrier arrangement, and at least one radially extending, elastically deformable restoring element by which the carrier arrangement and the deflection mass are coupled to be rotatable relative to one another. A supporting element is associated with the restoring element and movable radially relative to the restoring element by which the restoring element is supported in circumferential direction with respect to the carrier arrangement at a radial position of the supporting element. A stiffness of the coupling between the carrier arrangement and the deflection mass which is brought about in circumferential direction by the restoring element has an abrupt course at least one radial position of the supporting element.

30 Claims, 14 Drawing Sheets

(51) Int. Cl.
*F16F 15/121* (2006.01)
*F16F 15/123* (2006.01)

(56) References Cited

FOREIGN PATENT DOCUMENTS

| | | |
|---|---|---|
| DE | 199 19 458 | 3/2000 |
| DE | 10 2009 010 126 | 9/2009 |
| DE | 10 2010 053 542 | 6/2011 |
| DE | 10 2010 038 782 | 2/2012 |
| FR | 2828543 A1 * | 2/2003 ........ F16F 15/13157 |

* cited by examiner

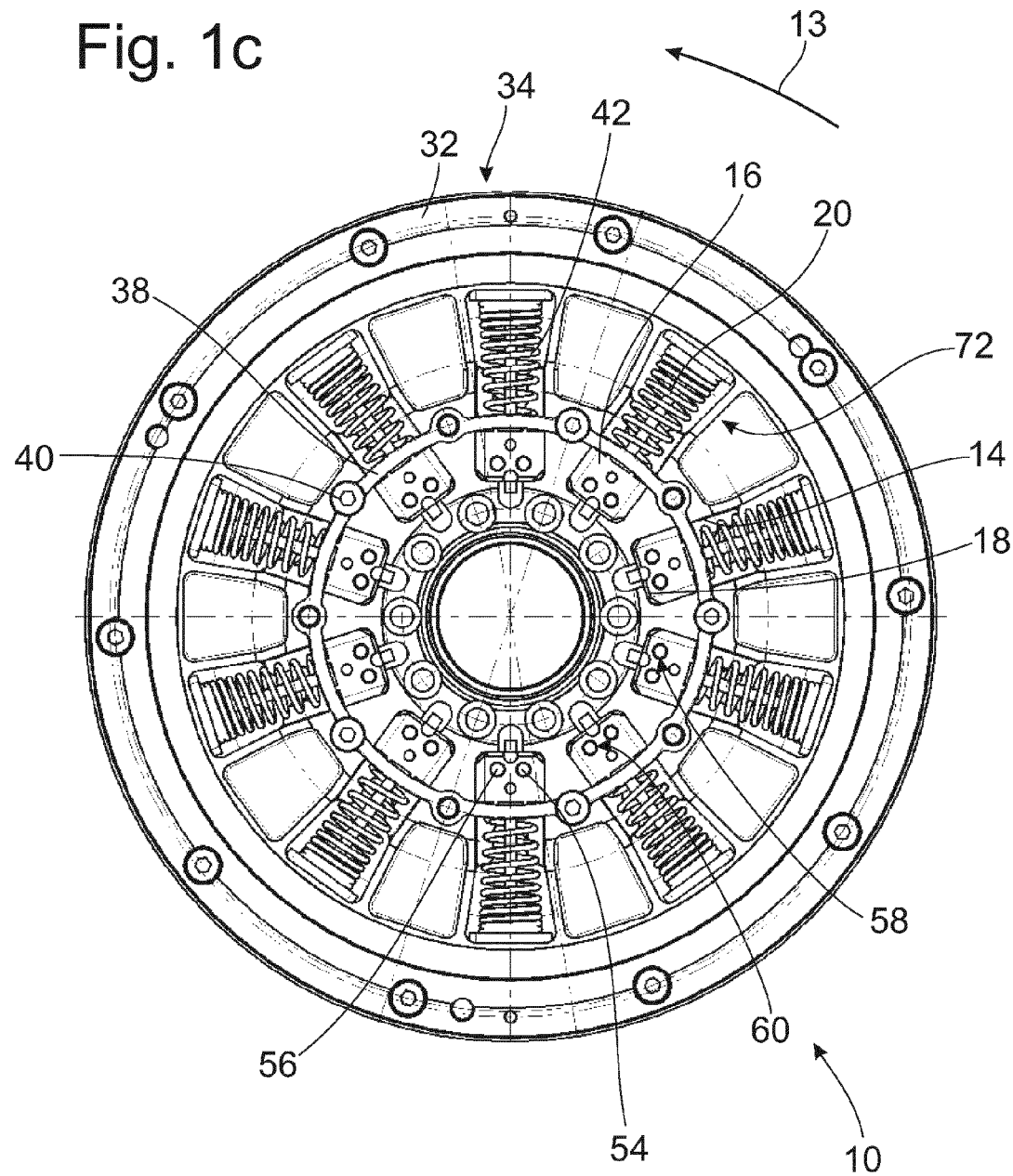

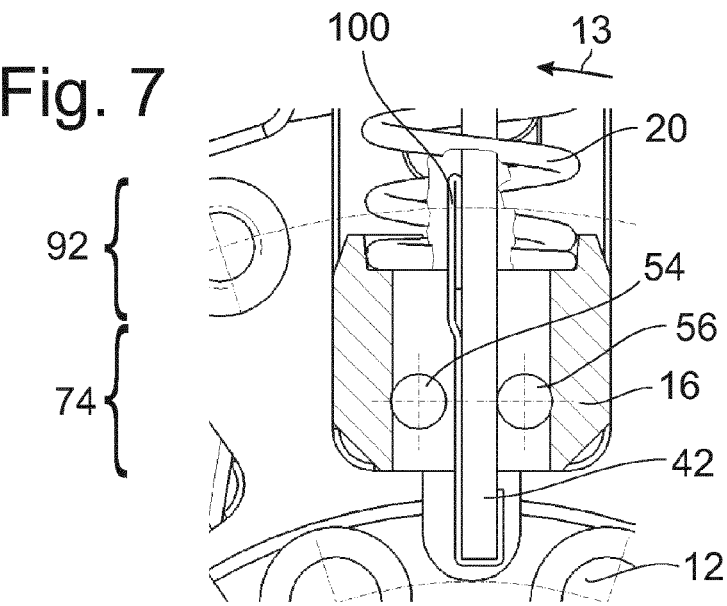
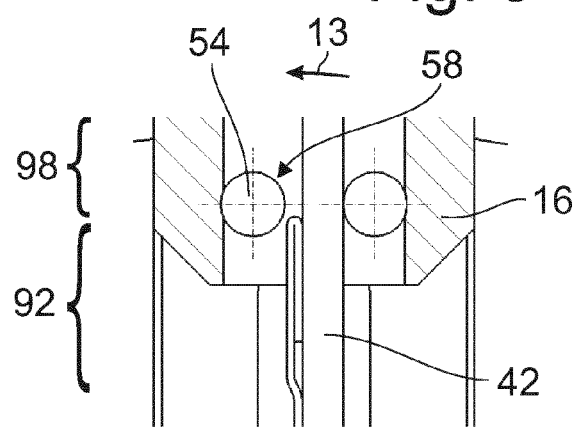
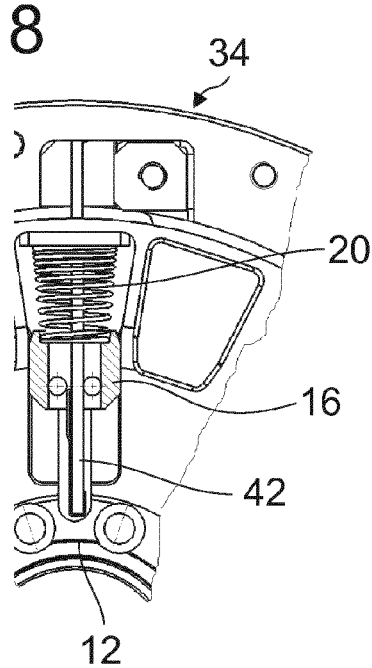

TORSIONAL VIBRATION DAMPER ASSEMBLY WITH SPEED-DEPENDENT CHARACTERISTICS

CROSS REFERENCE TO RELATED APPLICATIONS

This is a U.S. national stage of application No. PCT/EP2013/071417, filed on Oct. 14, 2013. Priority is claimed on German Application No.: DE 102012218918.1 filed Oct. 17, 2012, the content of which is incorporated herein by reference.

BACKGROUND OF THE INVENTION

1. Field of the Invention

The present invention is directed to a torsional vibration damping arrangement, preferably for the drivetrain of a vehicle.

2. Detailed Description of the Prior Art

Torque-transmitting torsional vibration dampers, vibration absorbers, and torsional vibration damping arrangements are often installed for enhancement of driving comfort and for suppression of vibrations in the drivetrain. Generally speaking, vibration absorbers, or tuned mass dampers, of this type are additional masses coupled with the drive system or torsional vibration damper by a spring system. A vibration absorber operates in such a way, for example, that a vibration system comprising a main mass and an additional mass is so tuned with respect to its natural frequency that at a certain excitation frequency the additional mass, referred to hereinafter as absorber weight or deflection mass, carries out a forced vibration, while the main mass remains at rest so that vibration frequencies can be efficiently suppressed.

In order to achieve the suppression of vibrations over a larger range of speed, speed-adaptive vibration absorbers, or tuned mass dampers, are used whose natural frequency or resonant frequency changes as a function of speed, for example, proportional to the speed. Thus by vibration absorber and torsional vibration damping arrangement is meant herein a device or mechanism or arrangement of components by which no torque is transmitted and which is capable of removing energy from the drivetrain at a determined, possibly variable, vibration frequency in order to suppress torsional vibrations occurring at this frequency.

To achieve a suppression of vibrations depending on speed in a torsional vibration damping arrangement of the type mentioned above, is it suggested in German Patent Application 10 2010 053 542 A1 that a flywheel which is rotatable around an axis of rotation is connected via a pendulum arm to a pendulum mass which is movable in circumferential direction relative to the flywheel, which pendulum arm extends substantially radially and can deform elastically. The pendulum arm can oscillate elastically around an oscillating point in circumferential direction, and the position of the oscillating point can be varied in radial direction. Through the oscillating point which can vary in radial direction, an imaginary pendulum length acting at the pendulum mass can be changed so that the pendulum mass can oscillate at a variable frequency and can accordingly damp different frequencies. It is further suggested that the oscillating point be displaced radially outward as a function of rotational speed in order to adapt the damping characteristics to the instantaneous rotational speed of the drivetrain.

While this solution may ensure a continuous tracking of the frequencies that can be efficiently damped, it has the disadvantage that comparatively large changes in the excitation frequency at a certain engine speed cannot be taken into account. In particular, torsional vibration damping arrangements of this type can only be configured for a damping order corresponding, e.g., in a combustion engine, to a predetermined cylinder count in a predetermined combustion stroke. This is because the rotational irregularities of internal combustion engines are predominantly generated by the cycled combustion of conventional reciprocating piston engines. It is not possible with the torsional vibration damper known in the art to tune the torsional vibration damping arrangement, e.g., to the fundamental frequency of the rotational irregularity in a first speed range of the engine and, e.g., to the first harmonic excitation of the fundamental frequency in a second speed range.

SUMMARY OF THE INVENTION

Therefore, there is a need for improved flexibility with respect to the speed adaptability and speed-dependent design of torsional vibration damping arrangements.

This is made possible by a torsional vibration damping arrangement that has a carrier arrangement that is rotatable around an axis of rotation, a deflection mass movable in a circumferential direction relative to the carrier arrangement, and at least one radially extending, elastically deformable restoring element by which the carrier arrangement and the deflection mass are coupled so as to be rotatable relative to one another. A supporting element associated with the restoring element is movable radially relative to the restoring element, and the restoring element is supported in circumferential direction with respect to the carrier arrangement by the supporting element at a radial position of the supporting element. The flexibility of tuning can be enhanced in that a stiffness of the coupling between the carrier arrangement and the deflection mass which is brought about in circumferential direction by the restoring element undergoes an abrupt change or has a discontinuous course at least at one radial position of the supporting element. An abrupt change makes it possible, at a predetermined radial position of the supporting elements, to alter the total stiffness of the torsional vibration damping arrangement or the stiffness of the connection between the carrier arrangement and the deflection masses of the torsional vibration damping arrangement in such a way that it is tuned to a different order of rotational irregularity within the drivetrain or to another vibration order of a driving combustion engine.

By "abrupt change" is generally meant herein a change in which the stiffness of the coupling during a change in the radial position of the supporting element by a predetermined path element changes appreciably more in the region of the abrupt change than in the adjoining regions with an identical change in the radial position of the supporting element. According to one embodiment of the invention the stiffness of the coupling changes during the abrupt change by at least 20%, by at least 45% or even by 90%. This change takes place within a predetermined path element that is extremely small or negligible compared to the total length of the possible radial positions of the supporting element. For example, a region making up less than 5% or 2% of the entire movability of the supporting element may be regarded as negligible in this sense.

For example, by an abrupt increase in the stiffness of the torsional vibration damping arrangement, i.e., in the stiffness of the coupling brought about between the carrier arrangement and the deflection mass(s) by the restoring elements, it can be possible to tune to double the vibration order. In other words, by a corresponding discontinuous or abrupt course of the stiffness of the coupling at a radial position of the supporting element corresponding to a given speed, the first harmonic of the fundamental vibration of a rotational irregularity excited by a combustion engine can be damped, for example, after this speed is reached. Depending on the rest of the components of the drivetrain or depending on the arrangement of the torsional vibration damping arrangement within the drivetrain, this can become the dominant mode causing a disturbance in the drivetrain.

Alternatively, a lowering of the order, particularly a reduction of the tuning frequency by $1/\sqrt{2}$, can also be achieved, for example, by halving the stiffness of the torsional vibration damping arrangement. Accordingly, an increase in the order by a factor of $\sqrt{2}$ can be achieved by doubling the stiffness of the torsional vibration damping arrangement. Generally speaking, with the torsional vibration damping arrangements according to the embodiment examples of the present invention which are more flexible with respect to the tuning of the vibration damping, virtually any factor can be selected in principle for the change in the vibration absorber stiffness or in the stiffness of the torsional vibration damping arrangement at a radial position of the supporting element, i.e., at a speed corresponding thereto. The change A in stiffness required for tuning the torsional vibration damping arrangement to a different order or frequency is given by the following equation: A=(target order/existing order)$^2$. In general, therefore, embodiment examples of torsional vibration damping arrangements according to the invention can be tuned not merely to a sole damping order as was the case heretofore, but rather to different damping orders in a speed-dependent manner. According to one embodiment this can be achieved by the discontinuous or abrupt course of the stiffness of the couplings brought about by the individual restoring elements in circumferential direction or opposite to the circumferential direction.

In one embodiment this can be achieved in that the support of the restoring element with respect to the carrier arrangement at the radial position of the supporting element is canceled. That is to say, an existing radially inner support is canceled radially outwardly or a previously nonexistent radially inner support is made possible proceeding from the radial position. The desired overall tuning can then be achieved by suitably combining with the further restoring elements of the torsional vibration damping arrangement. To the extent that the coupling in the circumferential direction is completely canceled in a region adjoining the radial position of the supporting element, an overall reduction of the stiffness of the torsional vibration damping arrangement can be achieved, for example, through combination with further restoring elements whose coupling at the same radial position is canceled opposite to the circumferential direction. Accordingly, for example, in a first restoring element of a first switching type, if the coupling via the restoring element in circumferential direction is canceled at the radial position of the supporting element associated with this first restoring element and, in a second restoring element of a second switching type, if the coupling of the restoring element opposite to the circumferential direction is canceled at the same radial position, the net effect is that a restoring element or vibration absorber spring is operatively removed in its entirety. Depending on the quantity of the rest of the restoring elements or bending springs in the system, this reduces the stiffness of the torsional vibration damper arrangement by a predictable amount.

According to one embodiment a stiffness of the coupling within a radially inner first region of radial position of the supporting element is selected so as to be lower than in a second region of positions of the supporting element adjoining the first region farther radially outward, and the stiffness of the coupling abruptly increases at the predetermined position of the supporting element, i.e., at the transition from the radially inner first region of positions to the second region of positions located farther radially outward, in order to tune the torsional vibration damping arrangement to a higher order of exciting frequency.

According to one embodiment, the characteristic curve of the stiffness can be adapted in such a way that the stiffness is lower again inside a third region of positions of the supporting element adjoining the second region radially outwardly of the second region, and the stiffness can decrease abruptly at a transition from the second region to the third region. An abrupt decrease in stiffness can be utilized in an advantageous manner, for example, to tune the torsional vibration damping arrangement to different orders of a combustion engine in different operating conditions, for example, with a different quantity of active cylinders, such that the vibration damping effect is optimal in all operating conditions.

According to one embodiment, the torsional vibration damping arrangement can be tuned in such a way that this torsional vibration damping arrangement is tuned to the second order of a four cylinder engine at lower speeds, i.e., to the main excitation frequency or fundamental frequency of the rotational irregularities brought about by the combustion stroke of the four cylinder engine. If two cylinders of the engine are cut out at higher speeds so that the engine can be operated at an optimal energy-efficient operating range again, the spring stiffness can be decreased to one fourth by selective deactivation of restoring elements, and a tuning to the first order can accordingly be achieved in two-cylinder operation. In two-cylinder operation, the first order is also the main excitation order, and by examples of torsional vibration damping arrangements according to the invention, the flexibility with respect to the configuration of the speed dependence is so high that even the rotational irregularities generated by the different active cylinder counts can be optimally damped through the same torsional vibration damping arrangement during operation of one and the same combustion engine. This can be particularly advantageous when the cylinder cutout is carried out in a speed-dependent manner. Any other scenarios for cylinder cutout are also possible, for example, switching from 8 to 4 cylinders or from 6 to 3 cylinders. Of course, uneven ratios, e.g., 8 to 6 cylinders or 6 to 4 cylinders, are also possible.

According to one embodiment of the present invention, the supporting element has a first circumferential supporting region for supporting the restoring element in circumferential direction and a second circumferential supporting region for supporting the restoring element opposite to the circumferential direction, and the first circumferential supporting region in the first region of positions of the supporting element is folded down or transferred from an active position effecting the support of the restoring element in circumferential direction into an inactive position. In other words, the abutment for the restoring element in the first region of radial positions of the supporting element is moved away from the restoring element or bending spring far enough so that it can no longer serve as abutment. The flexible coupling brought about by the restoring element in circumferential direction between the carrier arrangement and the deflection mass is interrupted or canceled in this way. In other words, the restoring element with the supporting element associated with it now only acts opposite to the circumferential direction. In alternative embodiments a restoring element may act only in circumferential direction from the outset such that after the folding down or removal of the circumferential supporting region, the restoring element is removed from the coupling between carrier element and deflection mass completely, i.e., in both directions.

According to one embodiment, to achieve this folding down of a portion of the supporting element, a guide in the carrier arrangement in which the supporting element can move radially is widened in circumferential direction in the first region of positions of the supporting element. That portion of the supporting element comprising the circumferential supporting region can be folded down in the region that is widened in this way. According to one embodiment, to make possible a reliable switching characteristic of a supporting element of this type or of a switchable sliding block of this type, an articulated part of the supporting element comprising the first circumferential supporting region is swivelable with respect to a fixed part of the supporting element comprising the second circumferential supporting region and is acted upon with respect to the fixed part by a relative force acting in circumferential direction. This relative force can be generated by a bending spring.

According to one embodiment, the abrupt course of the stiffness of the coupling is caused by the shape of the restoring element itself. For this purpose, an extension of the restoring element in circumferential direction in the first region of positions of the supporting element can be smaller than in the second region of positions, for example. In this way, it can be brought about that the restoring element cannot engage with the circumferential supporting region of the supporting element in the first region of positions due to the reduced thickness or reduced material of the restoring element in that region, so that no flexible coupling of the carrier arrangement and deflection mass takes place in circumferential direction via the restoring element until the supporting element has moved in radial direction as far as the second region in which the material thickness of the restoring element is sufficiently great that the supporting element can be utilized for support at the carrier arrangement.

A multiple-stepped switching characteristic can also be achieved with embodiment examples of this kind, for example, in that the extension of the restoring element in circumferential direction is again smaller in a third region of positions of the supporting element located radially outside of the second region of positions than in the second region.

According to one embodiment of the invention, in order not to obtain a different bending characteristic or stiffness variations due to the different extension of the restoring element in circumferential direction, the extension or material thickness of the restoring element in those regions in which an extension along the circumferential direction is reduced is increased in an axial direction perpendicular to the circumferential direction such that an area moment of inertia of the restoring element determining the elasticity is approximately identical in all of the regions. In other words, in some embodiment examples an axial extension of the restoring element in the first region and/or in the third region is increased relative to that in the second region such that an area moment of inertia of the restoring element in the second region corresponds to that in the first region and/or third region.

According to one embodiment of the invention, a cross section of the restoring element along the radial extension thereof is approximately constant, and a plate is arranged in the second region of positions on the side of the restoring element facing in circumferential direction, which plate is dimensioned such that in the second region the restoring element is supported via the plate at the radial position of the supporting element in circumferential direction with respect to the carrier arrangement. That is, the frictional engagement between the restoring element and the supporting element is produced in circumferential direction by a plate which causes the discontinuous or abrupt course of the stiffness by a discontinuous thickness or variation in thickness. Since the plate only serves for frictional engagement and does not introduce any additional bending stiffness into the system, the shape of the vibration absorber springs or restoring elements can remain constant along the entire radial extension thereof according to these embodiment examples.

According to one embodiment, the plate extends radially as far as the inner end of the restoring element, where it is folded over in the shape of a clip so that it can be arranged at the restoring element in a simple manner during the production process. Both make possible an economical manufacture of embodiment examples of torsional vibration damping arrangements according to the invention and the configuration of a variety of torsional vibration damping arrangements in the form of a modular system, since the spring characteristics and switching characteristics can be combined independently from one another to form a large number of characteristic curves. In other words, the tuning of the torsional vibration damping arrangement can be altered in almost any manner in the form of a building block with respect to the frequency to be damped or the vibration order to be damped. By "damping order" is meant in this respect the quantity of excitations for rotational irregularities occurring per revolution of the system. In a four cylinder four stroke Otto engine, two ignition processes of the fuel mixture take place per crankshaft revolution, which ignition processes in turn excite rotational irregularities. This fundamental frequency of the excitation accordingly corresponds to an excitation of the second order in the established terminology. Generally speaking, as a kind of building block, a plate bringing about the frictional engagement between the restoring element and the supporting element can be secured to a radially inner end of the restoring element by frictional engagement, positive engagement or bonding engagement in order to combine individual parts in keeping with a modular system.

In this context, a positive engagement means that a connection preventing the components connected to one another from moving relative to one another in at least one connection direction is brought about in that the geometry of the components used for the connection is selected in such a way that these components intersect in a direction perpendicular to the connection direction so as to prevent movement in the connection direction in this way. Frictional engagement in this context means that a connection preventing the components connected to one another from moving relative to one another in at least one direction is brought about by a force acting between the components perpendicularly to the connection direction, which force leads, for example, to increased cohesive forces or adhesive forces. In particular, a frictional engagement persists as long as a force brought about between the components by static friction is not exceeded. Bonding engagement in this context means that a connection preventing the components connected to one another from moving relative to one another in at least one direction is brought about by atomic or molecular forces. In so doing, the materials of the connected components can blend at least partially at an interface. This need not take place exclusively between the materials of the connected components alone. Rather, a material component which brings about or assists in the blending, for example, an adhesive or a material of a welding wire, can be provided additionally so that a plurality of materials are blended together at the interface on a microscopic scale.

According to one embodiment, an abrupt increase in stiffness of the torsional vibration damping arrangement at a predetermined radial position of the supporting element is achieved in that one or more restoring elements comprises or comprise a first partial element and a second partial element coupled with the radially outer deflection mass so as to be fixed with respect to rotation relative to it, and only the first partial element extends radially inward through the first region of positions, and the second partial element extends radially inward only as far as a boundary between the first region and second region. In other words, the predetermined position of the supporting element corresponds to that position up to which the second partial element extends radially inward so that, as soon as the second partial element also produces a frictional engagement with the supporting element, the stiffness of the torsional vibration damping arrangements abruptly increases, which can yield the advantages noted above.

According to one embodiment, a stiffness of the coupling is higher in a radially inner first region of positions of the supporting element than in an adjoining second region of positions which is located farther radially outward, and the stiffness of the coupling abruptly decreases at the transition from the first region to the second region. As was explained above, a speed-dependent abrupt decrease in stiffness of the torsional vibration damping arrangement may be particularly advantageous, for example, in engines with speed-dependent cylinder cutout, and takes into account the sharply varying excitation frequencies therein with optimal damping of rotational irregularities in each instance.

According to one embodiment, a three-step characteristic of a torsional vibration damping arrangement can also be achieved in that the stiffness of the coupling in a third region of positions of the supporting element that adjoins the second region and is located radially outside of the second region is higher than in the second region and increases abruptly proceeding from the second region. For example, in a configuration with cylinder cutout in which all of the cylinders are initially active at low speeds, i.e., for example, when starting, after which a plurality of cylinders are cut out in partial load operation and in which all of the cylinders are again active when full load is demanded, the shape of characteristic curve mentioned above can be used to achieve an optimal vibration damping or vibration cancellation in each of the three possible operating conditions.

According to one embodiment, the different stiffness can also be achieved in this case by varying thicknesses or extensions of the spacing element in circumferential direction along the radial extension.

According to one embodiment of the invention, to achieve a controlled speed-dependent radial movability of the supporting element that is adapted to the drivetrain, the supporting element is acted upon opposite to the radial direction by a preloading force and is movable outward in radial direction under the influence of a rotation-induced centrifugal force. Accordingly, the characteristic curve of the preloading force which can be exerted by a compression coil spring or the like, determines a radial position of the supporting element corresponding to the instantaneous speed and accordingly likewise determines an instantaneous switching state of the supporting element or the instantaneous stiffness of the coupling between the carrier arrangement and the deflection mass which is brought about by the restoring element and which has a discontinuous or abrupt course at least one location.

According to one embodiment, a torsional vibration damping arrangement comprises restoring elements of a first switching type and restoring elements of a second switching type which differ in that the restoring elements of the first switching type effect a coupling in circumferential direction between the carrier arrangement and the deflection mass which has an abrupt course at least one radial position of the supporting element, whereas this is effected opposite to the circumferential direction with the restoring elements of the second switching type, so that the jump in stiffness acts in different directions. According to one embodiment of the invention, a restoring element of a first switching type is arranged in each instance together with a restoring element of the second switching type within the torsional vibration damping arrangement such that the couplings of each type supplement one another in such a way that the effect produced when the predetermined radial position of the two supporting elements of the restoring elements is reached is as though one of the restoring elements had been completely removed from the coupling.

BRIEF DESCRIPTION OF THE DRAWINGS

Some embodiment examples of the invention are described in more detail in the following with reference to the accompanying drawings. The drawings show:

FIGS. 1a-e are a torsional vibration damping arrangement;

FIG. 7 is an enlarged section of the example from FIG. 6;

FIG. 8 is another enlarged section of the example from FIG. 6;

FIG. 9 is another enlarged section of the example from FIG. 6;

DETAILED DESCRIPTION OF THE PRESENTLY PREFERRED EMBODIMENTS

Figure 1A:
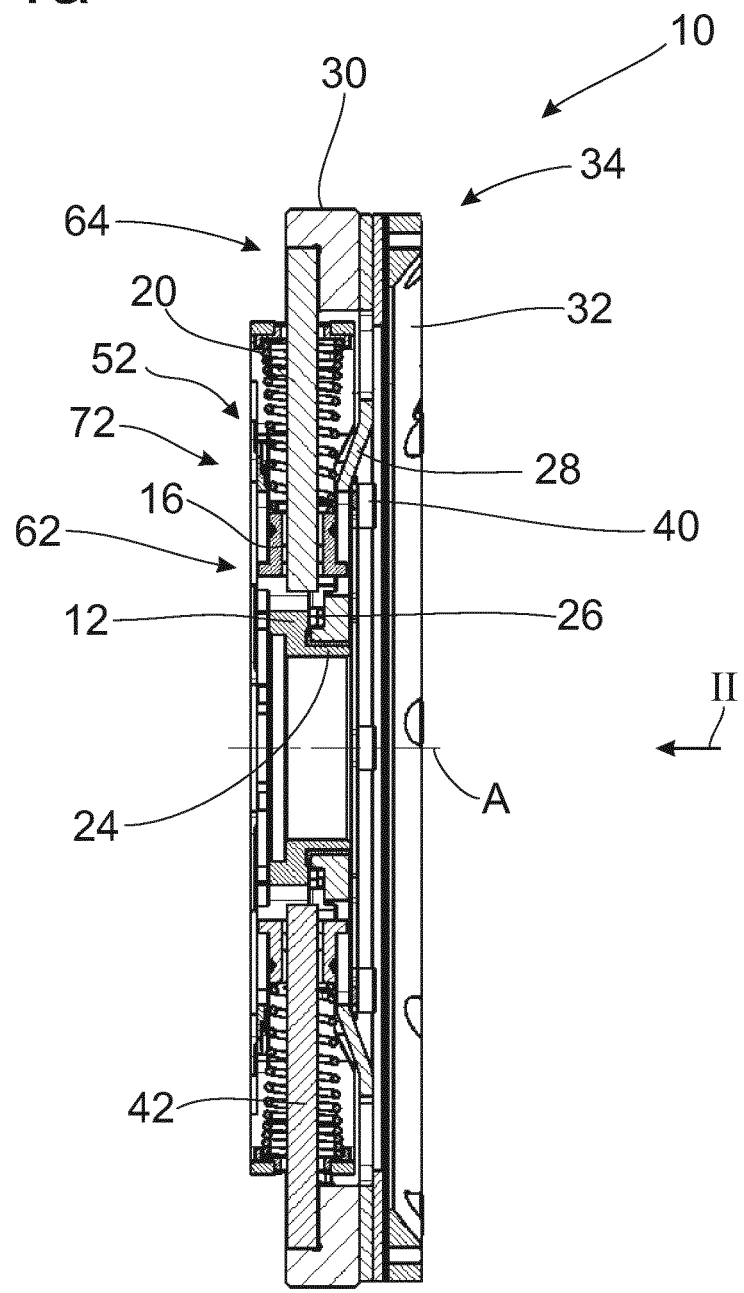
Figure 1B:
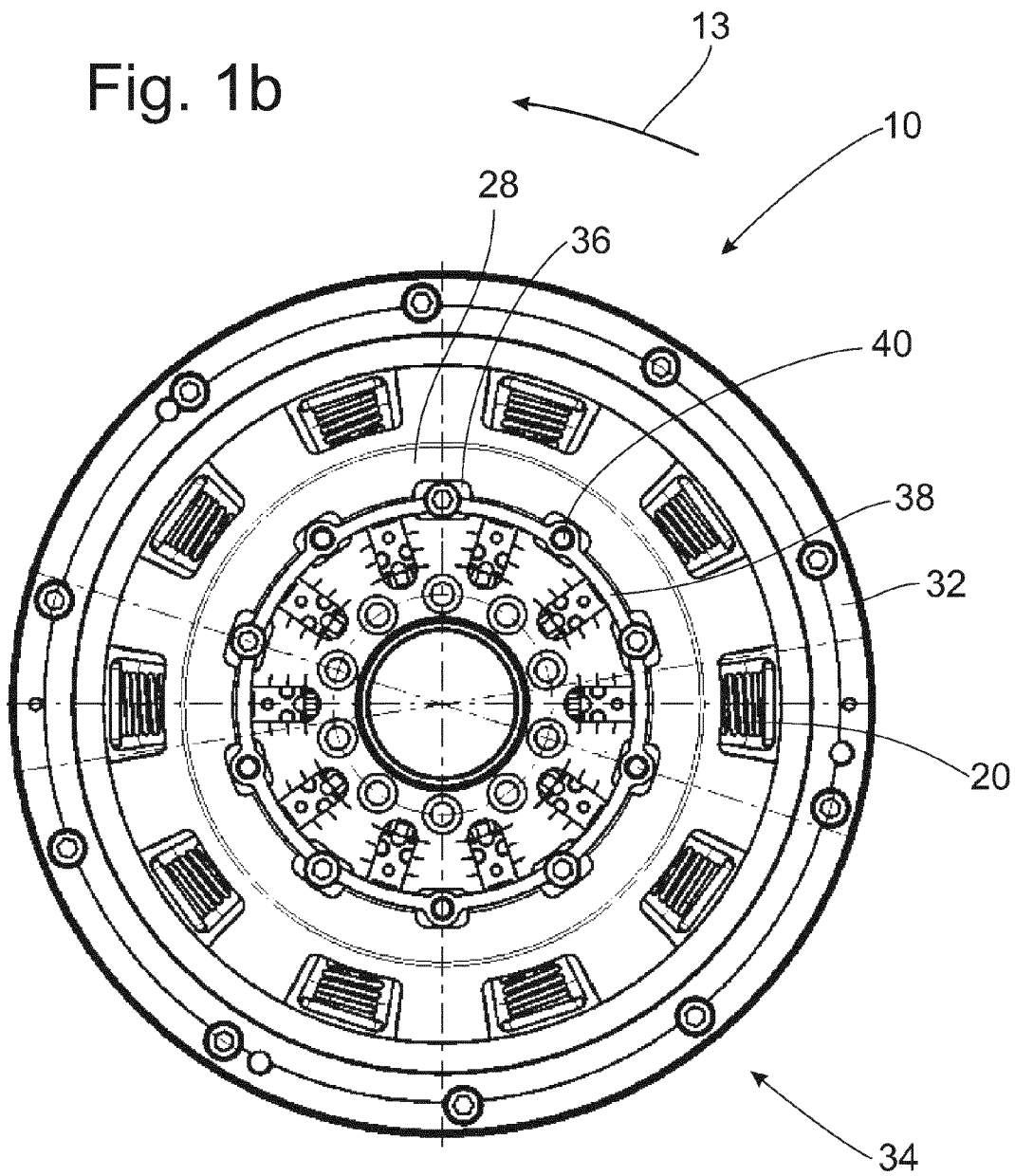
Figure 1D:
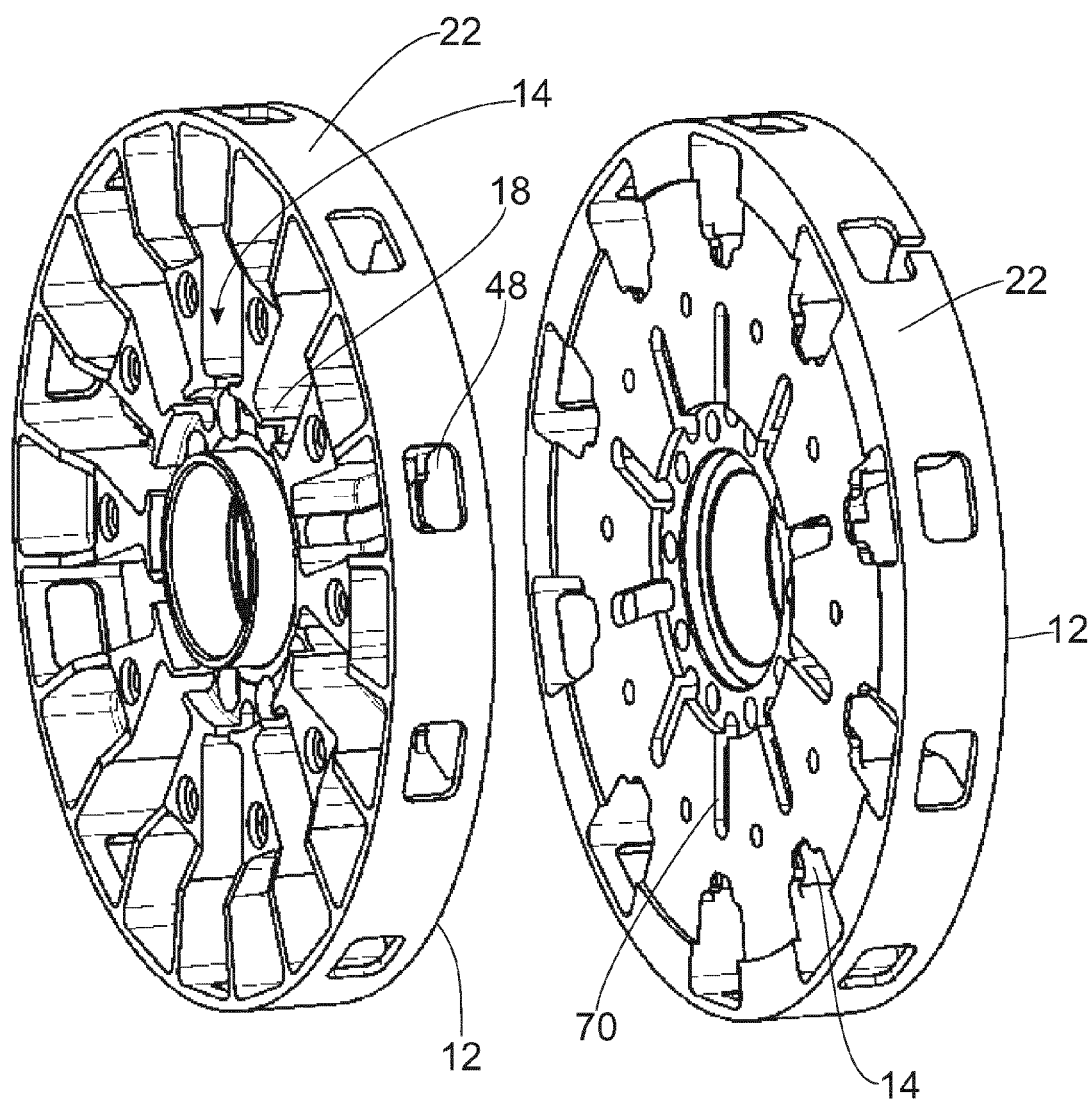
Figure 1E:
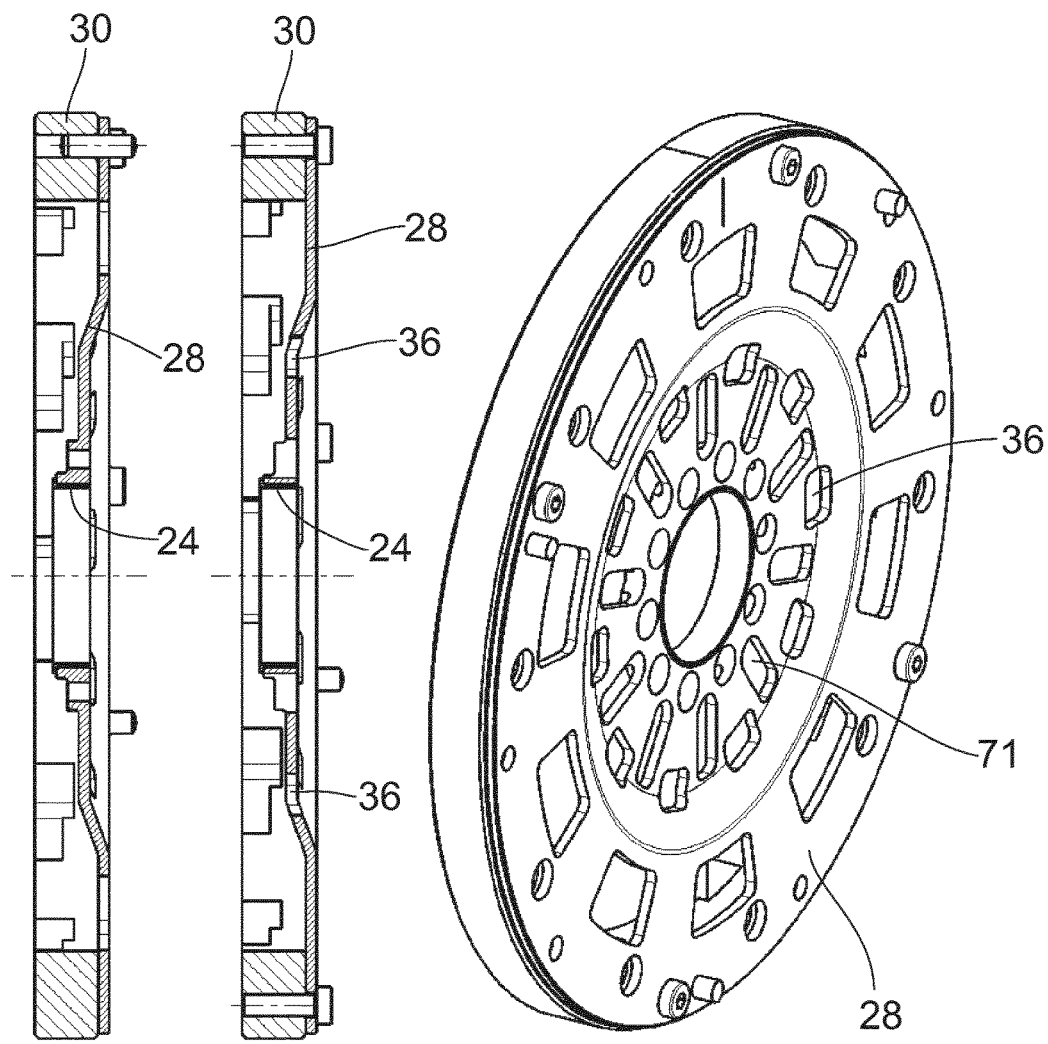

Exemplary embodiment examples will now be described with reference to the accompanying drawings. It will be noted in advance that the figures are not necessarily drawn to scale and that certain components can be highlighted artificially through the use of a different line thickness or shading to emphasize certain features or characteristics.

It is explicitly noted that further embodiment examples are not to be limited by the specific implementations shown in the figures. In particular, the fact that certain functionalities in the following figures are described in relation to specific entities, specific functional blocks or specific devices should not be construed to the effect that these functionalities should be, or even must be, allocated in the same manner in further examples. In further examples, certain functionalities, which are associated in the following with separate components or units, may be comprised in a single component or in a single functional element or can be carried out herein as functionalities combined in a single element or by a plurality of separate component parts.

It is further noted that when a specific element or component part is referred to as connected, coupled or linked to another element it is not necessarily meant that it is connected, coupled or linked directly to the other component part. When this is meant, it is explicitly noted by stating that the element is directly connected, directly coupled or directly linked to the further element. This means that no intermediate further element is provided which imparts an indirect coupling or connection or link. Further, identical reference numerals in the following figures denote identical components, components which function identically or components which function similarly, i.e., which are interchangeable by way of substitution between the different exemplary embodiments described in the following. Therefore, for a detailed description of a component part such as this which is shown in a figure, reference may also be had to the description of the component part or component element in another figure corresponding to that component part.

Before proceeding to embodiment examples of the present invention referring to FIGS. 2 to 13, an example of a conventional torsional vibration damping arrangement will first be described referring to FIGS. 1a to 1e for better comprehension of the context of the invention.

FIGS. 1a to e show an example of a torsional vibration damping arrangement, designated generally by 10, which can be integrated in or coupled with a drivetrain of a vehicle to perform the functionality of a speed-adaptive damper. The torsional vibration damping arrangement 10 comprises a carrier 12 that is to be fastened by screws to a drivetrain component for rotating therewith around an axis of rotation A. In the views in a circumferential direction 13, guides 14 are provided in this carrier 12 preferably approximately circumferentially equidistant at a plurality of circumferential positions, supporting elements 16 acting as flyweights being received in these guides 14 so as to be radially movable. The guides 14 are formed as substantially radially extending, elongated cutouts which are limited radially inwardly by stops 18 defining a radially inner basic position of the supporting elements 16. The supporting elements 16 are held in contact with the stops 18 radially inwardly, i.e., so as to be preloaded into and in the basic position, by preloading springs 20 formed as compression coil springs. To this end, the preloading springs 20 are supported at a radially outer annular edge region 22 of the carrier 12.

A carrier disk 28 is supported at the carrier 12 via a radial bearing 24 and an axial bearing 26 to be rotatable around the axis of rotation A with respect to the carrier 12. In its radially outer region, the carrier disk 28 carries a mass ring 30, for example, by screw connection at an axial side. A further mass ring 32 can be fastened to the other axial side, for example. Together with the mass ring 30 and possibly also mass ring 32, the carrier disk 28 forms a deflection mass, designated generally by 34. The carrier disk 28 and, therefore, the deflection mass 34 is axially secured to the carrier 12 by a plurality of bolts 40, for example, threaded bolts, which pass through cutouts 36 elongated in circumferential direction 13 and which hold an axial retaining ring 38 at the side of the carrier disk 28 remote of the carrier 12. Because of the circumferential movement play of the bolts 40 in the cutouts 36 of the carrier disk 28, the deflection mass 34 is rotatable around the axis of rotation A in corresponding circumferential movement play with respect to the carrier such that bolts 40 and cutouts 36 cooperate to limit relative rotational angle. In contrast to the schematic illustration in FIG. 1d, the carrier 12 can also be formed of a plurality of individual parts in a manner similar to the deflection mass 34, in which case it would more accurately be called a carrier arrangement. Therefore, the terms carrier and carrier arrangement are used synonymously in the following and in general denote that part of the torsional vibration damping arrangement that is movable in circumferential direction relative to the deflection mass 34.

The deflection mass arrangement 34 is coupled with the carrier 12 for power transmission by a plurality of circumferentially successive, substantially radially extending restoring elements 42. These restoring elements 42 which are formed, for example, as leaf springs or generally as bending beams are secured in their radially outer area to the mass ring 30. Proceeding from this fastening, the restoring elements 42 extend radially inward through openings in the edge region of the carrier 12 into a respective preloading spring 20.

Every restoring element 42, projects by its radially inner end region 50 into and through a central aperture of an associated supporting element 16. In the region of aperture 52, for example at pins 54, 56, there are two circumferential supporting regions 58, 60 spaced apart laterally at the supporting element 16. The restoring element 42 engages at these circumferential supporting regions 58, 60 such that it is supported at the instantaneous radial position of the supporting element 16 in the circumferential direction and opposite to the circumferential direction with respect to the carrier arrangement or carrier 12.

These circumferential supporting regions 58, 60 that are located on both sides of the radially inner end region 50 of the associated restoring element 42 in circumferential direction define in their entirety a carrier supporting region, whereas that region in which the radially outer end region of the restoring element 42 is secured to the mass ring 32 or, generally, to the deflection mass 34 can be referred to as deflection mass supporting region. The restoring element 42 can be received between the two circumferential supporting regions 58, 60 with movement play so as to allow a radial movement of the supporting element 16 in the associated guide 14 in the carrier 12 under centrifugal force. To prevent tilting of the supporting element 16 during this radial movement, the supporting element 16 can have, at both axially oriented sides thereof, lateral guide projections which extend into, and are radially movably guided and received in, associated substantially radially extending guide cutouts of the carrier 12 and 71 of the carrier disk 28, respectively. The cutouts 71 at the carrier disk can have a greater circumferential width than the cutouts in the carrier 12 so as not to impair the relative rotation of the carrier disk 28 with respect to the carrier 12 particularly by interaction of the guide projection 68 with the carrier disk 28. Further, a tilting of the supporting element 16 occurring under centrifugal force is prevented in that the center of mass M of the supporting element 16 is approximately centrally located in the aperture 52.

In the torsional vibration damping arrangement 10 having the constructional design mentioned above with reference to FIGS. 1a to 1e, a supporting element 16 which is radially movably guided in the carrier 12 and in a carrier arrangement rotatable relative to the deflection mass, the restoring element 42 cooperating with the latter, the preloading spring 20 which preloads the supporting element 16 radially inward into the basic position thereof, and the deflection mass 34 respectively form a deflection mass pendulum unit 72. In the depicted embodiment form, a total of ten such deflection mass pendulum units 72 are provided, wherein the carrier 12 is a shared carrier 12 for the supporting elements 16 of all of the deflection mass pendulum units 72, and the deflection mass 34 is a shared deflection mass 34 for all of the deflection mass pendulum units 72. However, the principles of the invention described in the following could basically also be realized when a separate and independent carrier is provided in association with each deflection mass pendulum unit 72 or at least with some of the deflection mass pendulum units 72 and/or when an independent deflection mass is provided in association with all of the deflection mass pendulum units 72 or with some of the deflection mass pendulum units 72. For reasons of stability and to prevent unwanted vibration states or to obtain a synchronous vibration behavior of all of the deflection mass pendulum units 72, it may be advantageous at least to combine all of the deflection masses in a common annular deflection mass 34.

Figure 2:
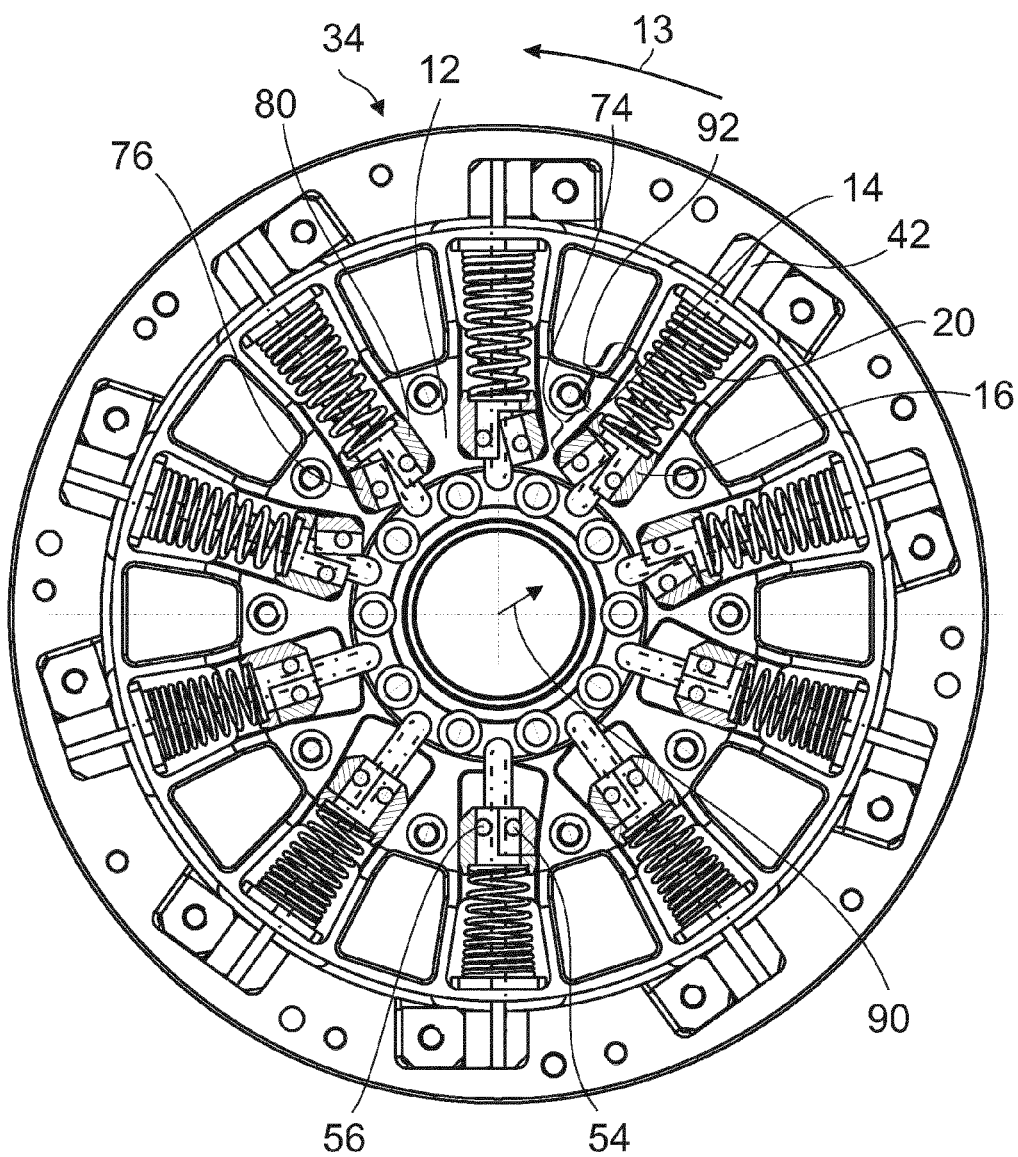
FIG. 2 is a view of a torsional vibration damping arrangement with switchable supporting element.

FIG. 2 shows an embodiment that differs from conventional torsional vibration damping arrangements substantially through the connection of the restoring element 42, particularly with respect to the manner in which a speed dependency of the stiffness of the torsional vibration damping arrangement is implemented. With the exception of the changes carried out in the embodiment shown in FIG. 2, particularly with respect to the supporting elements 16, the view of the embodiment example in FIG. 2 substantially corresponds to the view of the torsional vibration damping arrangement in FIG. 1c so that similarly functioning or identical components are denoted by the same reference numerals in the present case. Further, the axial retaining ring 38 and part of the mass ring 32 are omitted from the drawing compared to the comparison example in FIG. 1c to more clearly illustrate the functionality of the embodiment example in FIG. 2.

Figure 3A:
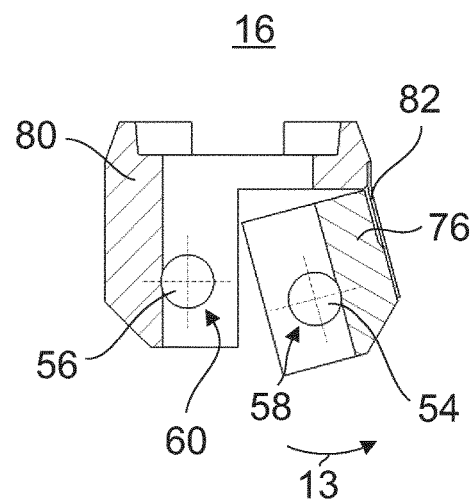
FIG. 3a,b are sections through a switchable supporting element.

To cancel the support of the restoring element 20 with respect to the carrier arrangement or carrier 12 in a radially inner first region of radial positions of the supporting element 16, the cross section of the guide 14 widens in circumferential direction 13 in a radially inner first region of positions 74 of the supporting element 16 in the embodiment example shown in FIG. 2. This makes it possible that examples of the carrier elements 16, which are shown in more detail in FIGS. 3a-4b, can fold the first circumferential supporting region 58 in circumferential direction 13 out of an active position causing the support of the restoring element 20 and into an inactive position when the carrier elements 16 are located in the region of the first positions 74. To make this possible, the supporting element 16 is formed of two parts, wherein the articulated part 76 comprising the first circumferential supporting region 58 is swivelable with respect to a fixed part 80 of the supporting element 16 comprising the second circumferential supporting region 60. To ensure that the supporting element 16 or bending block or articulated sliding block 16 actually opens in the widening in the first region of positions 74 of the supporting element 16, the articulated part 76 is acted upon by a relative force with respect to the fixed part 80, which relative force acts in circumferential direction 13 relative to the fixed part 80. FIGS. 3a, b and 4a, b show two main possibilities for generating a relative force of this kind. In the supporting element 16 shown in FIG. 3a, the force is generated by a bent spring plate 82 arranged at the side of the articulated sliding block or supporting element 16. FIG. 4a shows a similar constructional solution in which the articulated part 76 is rotatably supported with respect to the fixed part 80 by a pin 84, and an additional spring 86 applies the force in circumferential direction 13.

In other words, a connection of the carrier arrangement 12 to the deflection mass 34 via the restoring element in circumferential direction 13 is canceled in the first region of positions 74. Instead, the restoring element 42 or bending spring is elastically deformed only during a movement of the deflection mass 34 opposite to the circumferential direction 13.

When the supporting element 16 is moved radially outward in radial direction 90 against the action of the compression coil spring or preloading spring 20 as the speed increases, the stiffness of the coupling between the carrier arrangement 12 and the deflection mass 34 which is brought about in circumferential direction by the restoring element 20 changes at a position between the first region of radial positions 74 and a second region of positions 92 adjacent to this first region and adjoining this first region radially outwardly. In other words, a stiffness curve, which depends on the radial position of the supporting element 16, has an abrupt or discontinuous shape at this location.

This is achieved in that the cross section of the guide 14 narrows again in the second region of positions 92 of the supporting element 16 so that the articulated part 76 of the supporting element 16 is folded back through the guide 14 opposite to circumferential direction 13, and the first circumferential supporting region 58 accordingly proceeds from the inactive position 58 into an active position bringing about the support of the restoring element 42, where it serves as an abutment for the restoring element 42.

In other words, the restoring element 42 can be supported at the carrier 12 in the second region of positions 92 via the supporting element 16 in circumferential direction 13 and opposite to circumferential direction 13 so that a relative movement between the carrier 12 and the deflection mass 34 against the restoring spring force of the restoring element 42 takes place in both directions.

A configuration of the vibration damping arrangement in which the supporting elements 16 are in their radially inner inactive position in which the coupling of every restoring element 42 is canceled or disabled in one direction is shown in the top half of FIG. 2, whereas the bottom half shows a situation occurring at increased speed in which the supporting elements 16 have been driven radially outward and every restoring device 20 accordingly engages the respective circumferential supporting regions of the supporting elements 16 associated with it in circumferential direction 13 and also opposite to circumferential direction 13. Of course, the different situations in the top half and bottom half will never occur simultaneously in normal operation, but are shown together in a figure for the sake of clarity and for better comprehension.

In short, FIG. 2 shows a sectional view of a vibration absorber or torsional vibration damping arrangement in which the position of the sliding blocks or supporting elements 16 at low speed and, consequently, in radially inward position is shown in the top half. In this position, as is also shown in the detail in FIGS. 3a-4b, a support or a circumferential supporting region 58 is folded away in the case of every restoring element 42 or vibration absorber spring. Each of the vibration absorber springs or restoring elements 42 accordingly engages at only one support or at only one circumferential supporting region and can therefore operate either for pull or for push, i.e., in circumferential direction 13 or opposite to circumferential direction 13.

A low stiffness of the torsional vibration damping arrangement and, therefore, a low tuning frequency or tuning order is achieved in this way. In that the restoring elements 42 of the first switching type with the supporting elements 16 associated therewith and the restoring elements 42 of the second switching type are always installed or arranged in pairs so as to fold away alternately in circumferential direction 13 and opposite to circumferential direction 13 as in the embodiment shown in FIG. 2, this results in a symmetrical behavior with respect to the axis of rotation while preventing unbalances. In the present case, five right-hand and five left-hand sliding block assemblies or restoring elements 42 of the first switching type and second switching type are shown. It goes without saying that in alternative embodiments any other combination of restoring elements 42 of different switching types can be carried out. In particular, restoring elements 42 which are permanently connected to the carrier 12 by frictional engagement in circumferential direction 13 and opposite to circumferential direction 13 can also be used.

At increasing speed, as is shown in the bottom half of FIG. 2, the supporting element 16 is pushed into the second region of positions 92 for the supporting element 16 in which the guide 14 for the supporting elements 16 has two walls running parallel to one another. Accordingly, the first circumferential supporting region 58 is brought into engagement at the restoring element 42. Each of the restoring elements 42 is then engaged for both pull and push so that, as a result of this doubling of the quantity of parallel-connected restoring elements 42, the stiffness of the torsional vibration damping arrangement is also doubled, which leads to an increase in the tuning frequency or tuning order. Of course, alternatively, not all of the supporting elements 16 need be constructed so as to be switchable, so that intermediate ratios, for example, changes in the tuning frequency or tuning order by a factor of 0.75 or by any other factor, can be provided.

In general, a quadrupling of stiffness means a doubling of the tuning frequency or order, a doubling of stiffness means an increase in tuning frequency by a factor of a and a halving of stiffness means a decrease in the order by a factor of $1/\sqrt{2}$. FIG. 3a shows an embodiment of a supporting element 16, a bending sliding block, in the opened position. The bending sliding block has a switchable support or articulated part 76 in which is arranged the spring engagement region or first circumferential supporting region 58 which is connected via the flexible element 82 to the rest of the sliding block, i.e., to the fixed part 80 thereof. This connection can be realized by positive engagement, bonding engagement and/or frictional engagement by screwing, welding, gluing, soldering, riveting or by shaping processes. The flexible element 82 ensures that the second spring engagement region or circumferential supporting region 58 is brought reliably into the inactive position shown in FIG. 3a in which the latter does not engage with the restoring element 42 when the sliding block is arranged inside the first region of positions 74 of the guide contour, i.e., radially inside, as is shown in FIG. 2.

Figure 3B:
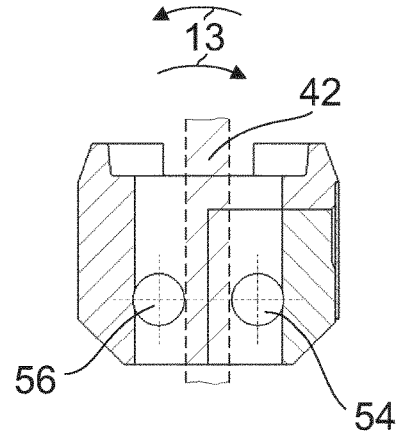
Figure 4A:
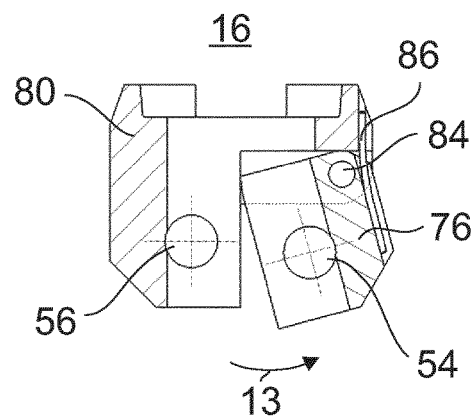
FIG. 4a,b are sections through a switchable supporting element.

FIG. 3b shows the bending sliding block or supporting element 16 shown in FIG. 3a in a closed configuration. Moving out against the force of the preloading spring 20, the supporting element 16 moves radially outward so that the supporting element 16 enters into the parallel region of the guide 14 and the distance between the two contact pins 56 and 54 forming the circumferential supporting regions 56 and 58 is minimal.

Figure 4B:
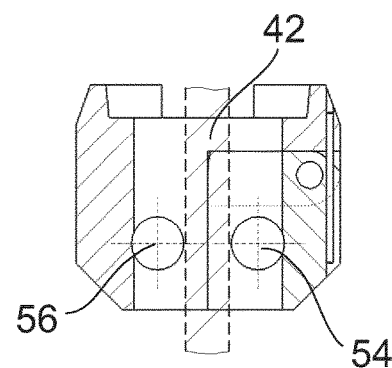

FIG. 4a shows an articulated sliding block in the open position corresponding to FIG. 3a. Instead of the flexible fastening 82 shown in FIGS. 3a and 4a, the switchable support or articulated part 76 of the supporting element 16 in FIGS. 4a and 4b is connected to the fixed part 80 by a bolt joint 84. An additional flexible element 86 ensures a definite position of the swiveled in part and prevents uncontrolled activation of further restoring elements 42. FIG. 4b shows the articulated sliding block from FIG. 4a in a closed configuration corresponding to the configuration of the bending sliding block shown in FIG. 3b.

Figure 5:
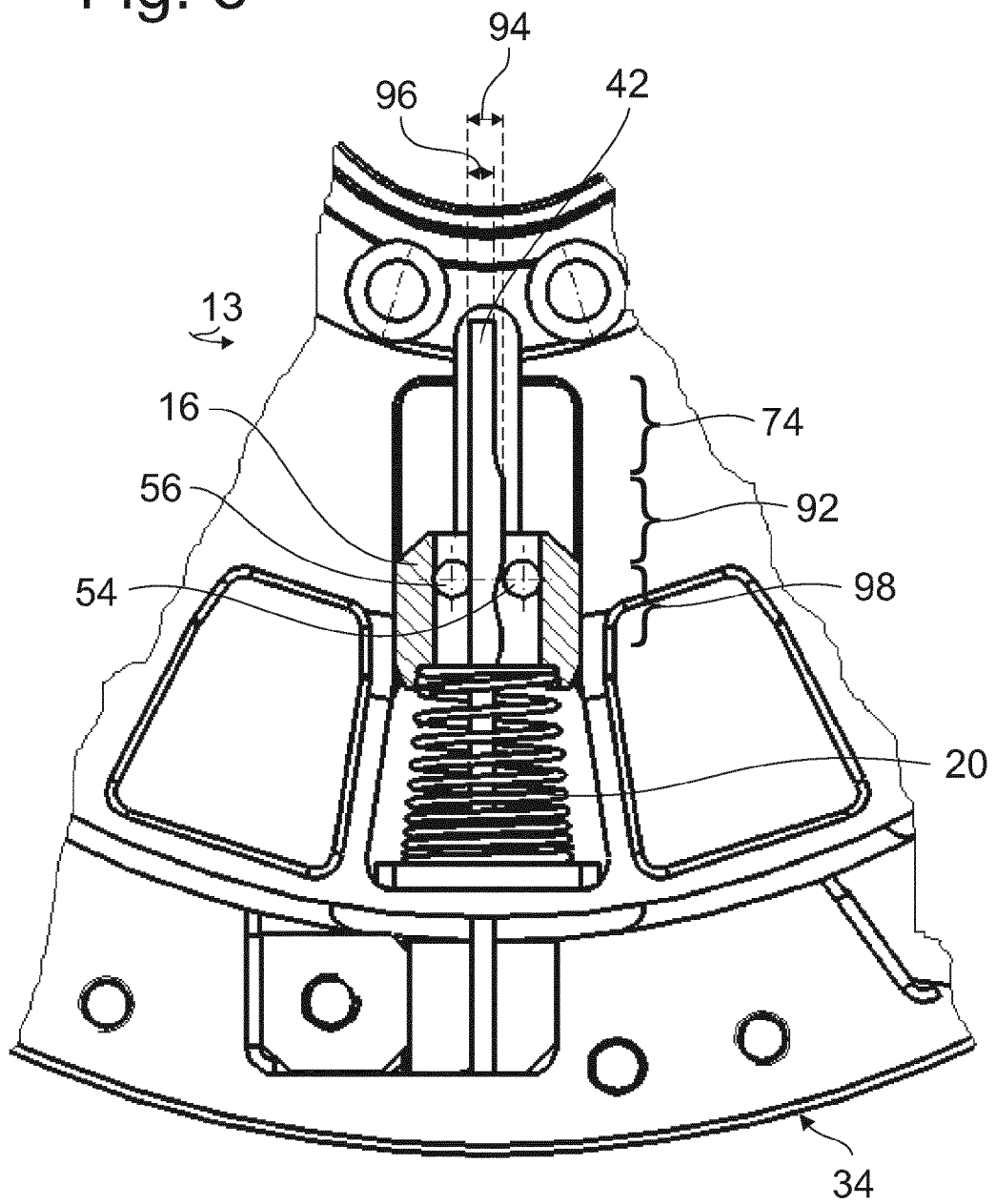
FIG. 5 is an enlarged section of a torsional vibration damping arrangement.
Figure 6:
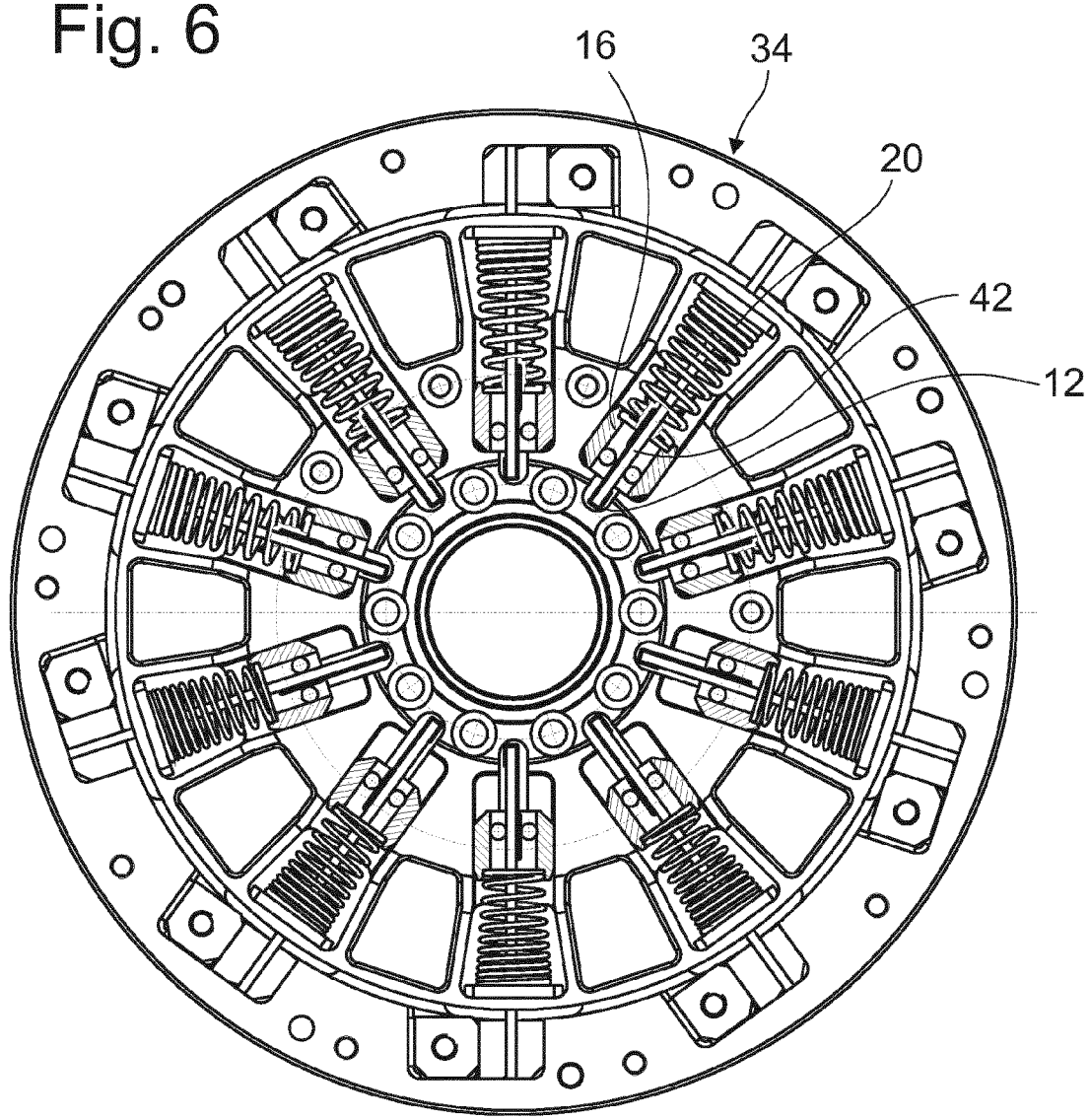
FIG. 6 is a view of a torsional vibration damping arrangement.

FIG. 5 shows a further embodiment example of a torsional vibration damping arrangement in which an abrupt course of the stiffness of the coupling between the carrier arrangement 12 and the deflection mass 34 is generated by the shape of the restoring element 42. For this purpose particularly the extension 94 of the restoring element 42 within the first region of positions 74 of the restoring element 16 in circumferential direction 13 is smaller than in the adjoining second region of positions 92 of the restoring element 16. In other words, the extension or thickness of the restoring element 42 in circumferential direction 13 is smaller in the first region of positions 74 so that the restoring element 42 cannot engage with the first circumferential supporting region 58 at pin 54 of the restoring element 16 in this region and the restoring force of the restoring element 42 is accordingly switched off in this region during a movement in circumferential direction 13. As soon as the supporting element 16 moves radially outward as far as the second region of positions 92 under centrifugal force, the second circumferential supporting region 58 of pin 54 makes contact with the restoring element 42 and the coupling is restored in circumferential direction 13 so that the stiffness of the coupling caused in circumferential direction 13 by the restoring element 42 between the carrier arrangement and deflection mass increases abruptly.

Further, in the embodiment shown in FIG. 5, in which a third switching type is realized, i.e., within a third region of positions 98 radially outwardly of the second region of positions 92, the stiffness of the coupling is again smaller than in the second region of positions 92, which is implemented in the present case in that the extension of the restoring element 42 in circumferential direction 13 is also smaller in the third region of positions 98 than in the second region of positions 92.

In the present case, the axial extension of the restoring element 42 is larger in the first region of positions 74 and in the third region of positions 98 than in the second region of positions 92, so that the bending stiffness opposite to circumferential direction 13 in which the coupling is not disabled remains identical throughout the entire radial position of the supporting element 16. To this end, the axial extension of the restoring element 42 is preferably increased in such a way that an area moment of inertia of the restoring element 42 in the second region 92 corresponds to that in the first region 74 and third region 98.

Thus according to one embodiment of the invention, as is illustrated in FIG. 5, a profiled vibration absorber spring or a profiled restoring element 42 is used. Due to the different thickness of the profiled restoring element 42 along the radial dimension thereof, the engagement behavior of the vibration absorber spring or of the restoring element 42 can be made dependent upon the radial position of the sliding block or supporting element 16 and, accordingly, upon speed. Therefore, individual restoring elements 42 can be enabled or disabled with respect to their efficiency in circumferential direction 13 or in circumferential direction 13 and opposite to circumferential direction 13. Depending on the contour of the thickness or path of the extension of the restoring elements 42 in circumferential direction 13, both spring supports or both circumferential supporting regions 58 and 60 or only one of the two serve to support the restoring element 42 depending on the radial position of the supporting element 16. In the case shown in FIG. 5, this is pin 54, for example. Accordingly, it can be determined whether all of the restoring elements 42 or only some of the restoring elements 42 act in a determined direction in a system having a plurality of such restoring elements 42. The difference in area moment of inertia brought about by the difference in thickness can advantageously be compensated against bending by a suitable width of the restoring elements 42 in the region in which they have a reduced extension in circumferential direction 13.

FIGS. 6 to 9 show a further embodiment example of a torsional vibration damping arrangement in which a cross section of the restoring element 42 is approximately constant along the radial extension thereof, wherein a plate 100 is arranged within the second region of positions 92 on the circumferential direction side of the restoring element 42, this plate 100 being dimensioned such that the restoring element 42 is supported via the plate 100 at the radial position of the supporting element 16 in circumferential direction 13 with respect to the carrier arrangement 12 in the second region of positions 92. The description referring to FIG. 2 also applies with regard to the selected view of the torsional vibration damping arrangement in FIG. 6. In other words, the top half and in the bottom half show different configurations occurring in operation which can never occur simultaneously in actual operation but which are shown together in one drawing for the sake of better comprehension.

Therefore, the functionality of the embodiment will be discussed primarily referring to FIGS. 7 to 9.

By plate 100 within the meaning employed above is meant any material that is separate from the material of the restoring element 42 and which is stable enough to support the load occurring in operation when the restoring element 42 is supported at the pin 56 via the plate 100.

The use of an additional plate 100 has the advantage that the switching characteristic, i.e., the deliberate realization of an abrupt rise or fall in the stiffness of the coupling between carrier arrangement 12 and deflection mass 34, is generated by an additional element, and the bending characteristic of the restoring element 42 is accordingly not impaired by the components determining the switching properties. In other words, without needing to modify the existing construction of a restoring element 42, virtually any switching characteristic or any characteristic of the coupling stiffness can be achieved through different dimensioning of plates 100. This makes it possible in particular to use an inexpensive modular system by which any characteristics can be implemented with a quantity of ready-made parts.

In the embodiment shown in FIGS. 6 to 9, the plate 100 extends radially as far as the inner end of the restoring element 42 and is wrapped around the latter. This can be utilized during manufacture so that the different components of a modular system can be provided simply by snapping in a plate 100 adapted to the required switching characteristic in that the plate 100 is fitted or snapped on with its radially inner end around the restoring element 42. In other words, the embodiment shown in FIGS. 6 to 9 allow the construction of an economical building block by which the spring properties and shifting properties can be combined independently of one another to form a large quantity of characteristic curves for the stiffness of the coupling between carrier arrangement 12 and deflection mass 34.

It will be appreciated that the connection between the plate 100 and the restoring element 42 can be produced by positive engagement, frictional engagement or bonding engagement in any other manner.

Further, as is obvious from the detailed view shown in FIG. 9, it is possible by the plate 100 to achieve a switching characteristic of at least three steps because when the supporting element 16 exits from the second region of positions 92 it loses contact with the restoring element 42 and loses the frictional engagement with the latter such that the coupling in circumferential direction 13 is canceled again in the third region of positions 98. Of course, it is also possible in principle to realize multiple-stepped switching characteristics in that, for example, the plate is folded three times in the second region of positions 92 and extends farther radially outward over the third region of positions 98, which could be followed again by a triply folded region in which the frictional engagement is restored.

As is shown particularly clearly in FIG. 7, the plate 100 is fitted to the restoring element 42 from the radially inner side and, as a result, is securely held even at high speed. In the second region of positions 92, the plate 100 is made thicker, for example, by folding it over one or more times, i.e., the extension in circumferential direction 13 is increased so that the restoring element 42 engages the pins 54 and 56 in both directions in a position of the supporting element 16 inside the second region of positions 92 or, more precisely, when pin 54 or the circumferential supporting region 58 at pin 54 is located within the second region of positions 92, such that when the restoring elements 42 are arranged in the manner shown in FIG. 6 all of these restoring elements 42 act in parallel.

As was already mentioned, the plate 100 or switching plate shown in FIGS. 6 to 9 allows three possible conditions. In the first region of positions 74 in which the supporting element 16 or sliding block with the circumferential supporting regions 58 and 60 is located far radially inward (i.e., at low speed), the first circumferential supporting region 58 for the restoring element 42 is released and the stiffness of the vibration absorber in its entirety is correspondingly small. In the second region of positions 92, both the first circumferential supporting region 58 and the second circumferential supporting region 60 act as support for the restoring element 42, i.e., on the pull side and push side. In the radially outer position, i.e., in the third region of positions 98, only one support is active so that the stiffness of the restoring element 42 or the effective coupling thereof between carrier 12 and deflection mass 34 turns out to be smaller again. Accordingly, the tuning of the torsional vibration damping arrangement in its entirety can be carried out in a speed-dependent manner in this way, particularly with respect to the frequency or order of rotational irregularity to be damped.

The condition at high speed is shown in particular in an enlarged view in FIG. 9, wherein the supporting element 16 is located very far radially outward and only one of the two pins, namely pin 54, supports the restoring element 42.

Alternatively, in one embodiment, the thickened area of the plate 100 in the first region of positions 74 can be relocated radially inward so that all of the restoring elements 42 are engaged from the outset, i.e., at low speed, and the system of the torsional vibration damping arrangement can be tuned to damp, e.g., the second order (main excitation order) of a four cylinder engine. In this case, for example, at higher speed, the stiffness can be reduced to one fourth through selective deactivation of individual restoring elements 42, which corresponds to a tuning of the torsional vibration damper arrangement to the first order of a two cylinder engine. This can be particularly advantageous, for example, in engines with controlled, speed-dependent cylinder cutout, since the rotational irregularities can be damped to a maximum extent in all operating conditions.

Further examples in which a configuration of this type is advantageous are cylinder cutouts from eight to four cylinders or from six to three cylinders. A characteristic curve corresponding to this is discussed more fully in the following referring to the embodiment shown in FIG. 11.

Figure 10:
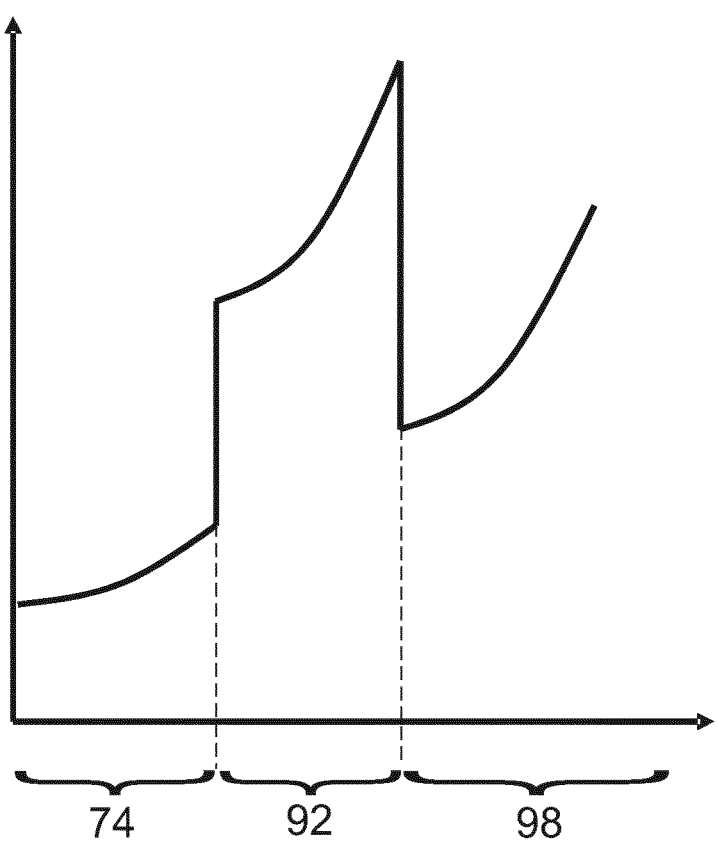
FIG. 10 is a graph of a coupling stiffness between a carrier arrangement and a deflection mass of the torsional vibration damping arrangement.

FIG. 10 shows a characteristic curve of the stiffness of the coupling between the carrier 12 and the deflection mass 34 such as can be achieved with the torsional vibration damper arrangements discussed with reference to FIGS. 2 to 9. In this regard, FIG. 10 shows the speed of the drivetrain on the x axis in arbitrary units and, on the y axis also in arbitrary units, the stiffness of the coupling, i.e., qualitatively speaking, the force with which the sum of the restoring elements 42 in the torsional vibration damper arrangement act against a deflection of the deflection mass 34 from the inactive position thereof.

The three-step characteristic curve shown by way of example can be realized by the described torsional vibration damper arrangements. In the first region of positions 74, the stiffness of one half of the coupled restoring elements 42, or of any quantity of the coupled restoring elements 42, can increase progressively over the speed under the influence of the supporting element 16 moving radially outward. In the second region of positions 92, the stiffness increases abruptly, i.e., the stiffness of the coupling caused by the restoring elements in circumferential direction 13 changes abruptly at the position or boundary between the first region of positions 74 and the second region of positions 92. According to one embodiment, the tuning can be selected such that an abrupt doubling of the stiffness occurs when the supporting element 16 moves out of the first region of positions 74 into the second region of positions 92 because all of the restoring elements 42 can now work in both regions. In the third region of positions 98, the same tuning as that in the first region of positions 74, in which one half of the restoring elements 42 in one direction are deactivated, can now be selected again, for example, so that the stiffness of the coupling between carrier 12 and deflection mass 34 is also correspondingly higher as a result of the conventional order tracking through the increased speed. In other words, the characteristic curve in the third region of positions 98 is then a continuation of that in the first region of positions 74. As has already been stated, the quantity of restoring elements 42 of a first switching type and second switching type, i.e., those that can be deactivated in circumferential direction 13 and those that can be deactivated opposite to circumferential direction 13, can be combined in any manner. However, it is advantageous to aim for a symmetrical construction in order to prevent unbalances in the system.

Figure 11:
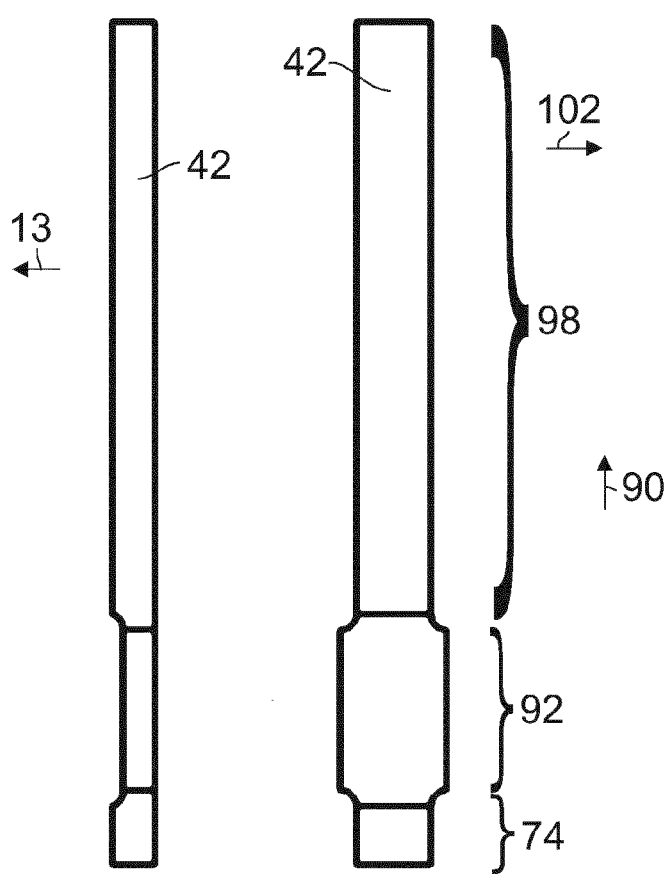
FIG. 11 is an enlarged view of a restoring element of a torsional vibration damping arrangement.
Figure 12:
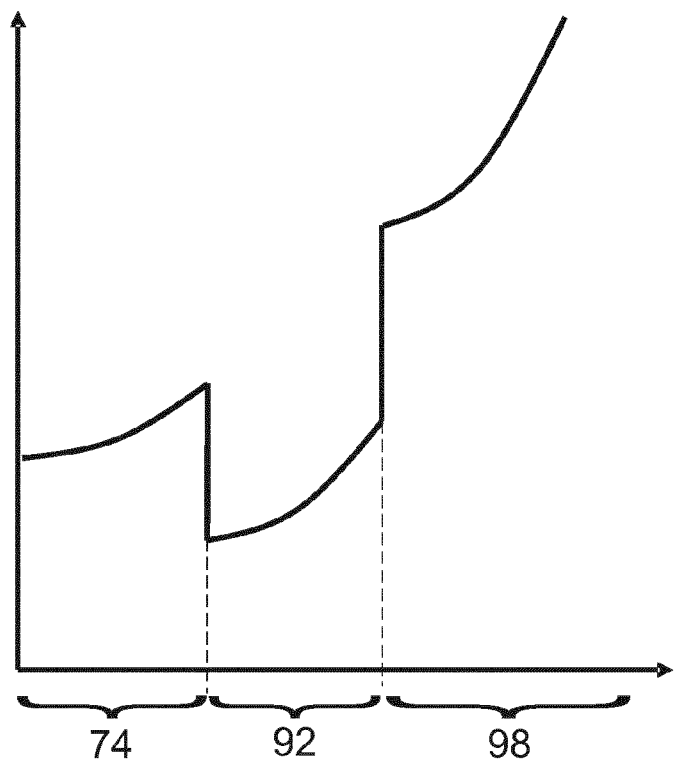
FIG. 12 is an a graph of a coupling stiffness between a carrier arrangement and a deflection mass of the torsional vibration damping arrangement.

FIG. 11 shows a restoring element 42 of one embodiment of a torsional vibration damper arrangement that can result in the profile shown in FIG. 12 or the qualitatively represented speed-dependent characteristic curve of stiffness between the coupling of the carrier 12 and the deflection mass 34 shown in FIG. 12. The mechanism that leads to a change in the characteristic curve in the restoring element 20, which is shown in FIG. 11 has a thickness profile which varies in radial direction 90 corresponds to that which has already been discussed referring to the embodiment example in FIG. 5, so that this embodiment may be referred to regarding the particulars of the comments made in this respect.

In the embodiment shown in FIG. 11, the extension of the restoring element 42 in circumferential direction 13 is greater in the radially inner first region of positions 74 of the restoring element 74 than in the adjoining second region of positions 92. Following this is a third region of positions 98 in which the extension in circumferential direction 13 again corresponds to that in the first region of positions 74. In other words, the variation in thickness of the restoring element 42 in radial direction 90 shown in FIG. 11 results in a configuration in which a stiffness of the coupling is higher within a radially inner first region 74 of positions of the supporting element 16 than in an adjoining second region of positions 92 lying father radially outward. Further, the stiffness of the coupling is again higher inside a third region 98 of positions of the supporting element 16 adjoining the second region radially outwardly of the second region 92 than in the second region. The transitions between the first region 74 and the second region 92 and between the second region 92 and the third region 98 are abrupt. This gives the characteristic curve shown in FIG. 12, wherein the speed of the drivetrain is shown on the x axis in arbitrary units and the stiffness of the coupling between the carrier 12 and the deflection mass 34 is shown on the y axis in arbitrary units analogous to the curve shown in FIG. 10.

In the first region of positions 74 which is tuned to low speeds, the torsional vibration damper arrangement can be protected against overload, for example, by the increased stiffness before passing at a defined speed into the second region of positions 92, where the cancellation or damping of the order of rotational irregularities to which the torsional vibration damping arrangement is tuned is initiated. After the transition into the third region of positions 98, the restoring elements 42 which were previously disabled are enabled again so that the tuning frequency or order of tuning of the vibration damping arrangement is increased again in order to allow a canceling effect or damping as the speed continues to increase. Insofar as the tuning is carried out by the embodiment illustrated in FIGS. 11 and 12 to a drivetrain without cylinder cutout, a cancellation effect can still be achieved within the third region of positions 98 even though this cancellation effect goes beyond the actual anticipated dynamic range.

Alternatively, as has already been discussed above referring to the embodiment example in FIGS. 6 to 9, a tuning shown in FIG. 12 can be particularly favorable for a scenario in which a cylinder cutout is carried out in a combustion engine in a determined speed range, which would correspond to the second region of positions 92 in the present case. For example, if the abrupt drop between the first region of positions 74 and the second region of positions 92 is such that the stiffness of the torsional vibration damping arrangement is decreased to one fourth by the drop, the full cylinder count, for example, four cylinders, can be optimally damped initially in a low speed range, whereupon one half of the cylinders can be cut out in the second region of positions 92 and the rest can be operated in an optimal, energy-saving operating mode. Insofar as maximum power is required in the drivetrain, the cut-out cylinders can be activated again proceeding from a further limiting speed corresponding to the boundary between the second region 92 and the third region 98, wherein an optimal suppression of rotational irregularities can be ensured simultaneously in all operating ranges by embodiment examples of torsional vibration damper arrangements according to the invention.

Further, as can be seen from FIG. 11, in order to maintain identical bending properties opposite to circumferential direction 13 in the restoring element 42 of FIG. 11 in the second region of positions 92, the extension of the restoring element 42 in axial direction 102 is increased so that the area moment of inertia in the second region of positions 92 corresponds to that in the first region of positions 74 and in the third region of positions 98 so as not to impair the bending properties of the restoring element 42 opposite to circumferential direction 13.

Figure 13A:
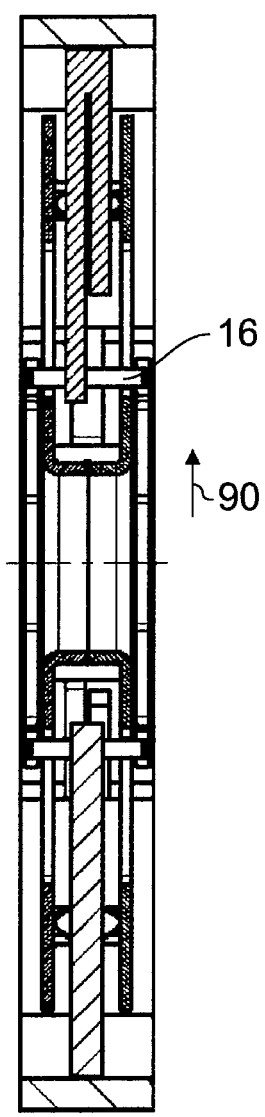
FIG. 13a, b is a section through a torsional vibration damping arrangement.

FIG. 13a,b shows a further embodiment of a torsional vibration damping arrangement in section in which abrupt transitions in the stiffness of the connection between the carrier 12 and the deflection mass 34 can be achieved by splitting the radially extending restoring elements 42. In order to achieve an abrupt increase in the stiffness of the coupling in the transition between the first region of positions 74 of the supporting element 16 and second region of positions 92, the restoring element 42 is split in two in the embodiment example shown in FIG. 13, wherein a first partial element 102a of the restoring element 20 extends radially inward as far as the first region of positions 74 and a second partial element 102b extends through the second region of positions 92 and only as far as the boundary of the first region of positions 74. At the same time, the two partial elements 102a and 102b are coupled radially outwardly with the deflection mass 34 so as to be fixed with respect to rotation relative to it.

Figure 13B:
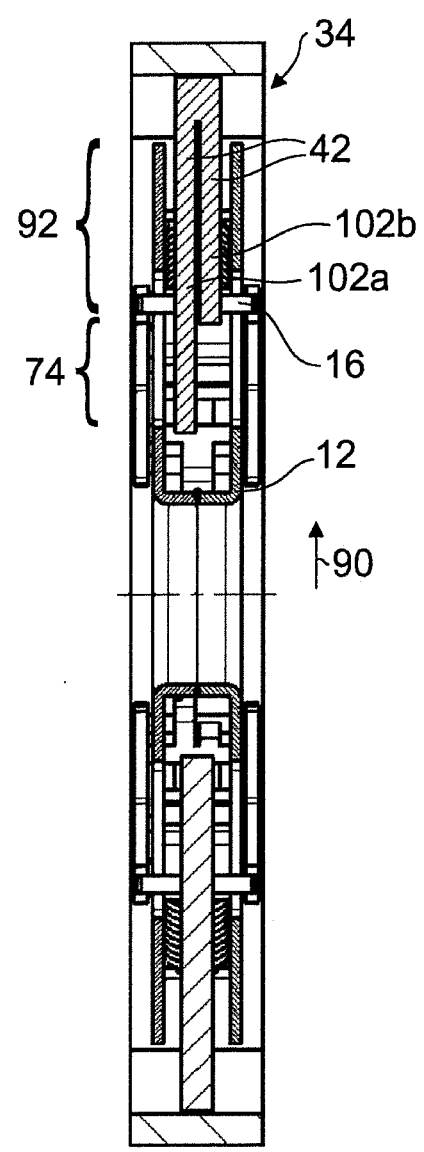

Accordingly, an abrupt increase in stiffness is achieved in this case by utilizing two partial elements 102a, 102b which are independent from one another with respect to bending properties or a split restoring element 42, wherein the second partial element 102b engages with the supporting element 16 only after a predetermined radial position of the supporting element 16 inside the second region of positions 92, but is then operative in circumferential direction 13 as well as opposite to circumferential direction 13. Among the advantages of the embodiment shown in FIG. 13 is that, as a result of the simple shape and geometry of the restoring elements 42, these restoring elements 42 have a constant area moment of inertia over the entire radial extension or over the entire bending length. Further, the activation and deactivation of individual partial elements is not dependent on the instantaneous rotational angle or oscillating angle of the deflection mass 34 or vibration absorber. Depending on the radial position of the supporting element 16 or rotational circumferential supporting regions, either one partial element 102a or both partial elements 102a and 102b are in engagement. The design shown in FIG. 13 also allows a modular system to be provided, since the supporting elements 16 can always be identical with constant spring thickness and, by the length of the individual partial elements, of which there may also be more than two in further embodiment examples, requirements can be met in an optimal manner independently thereof.

Figure 14:
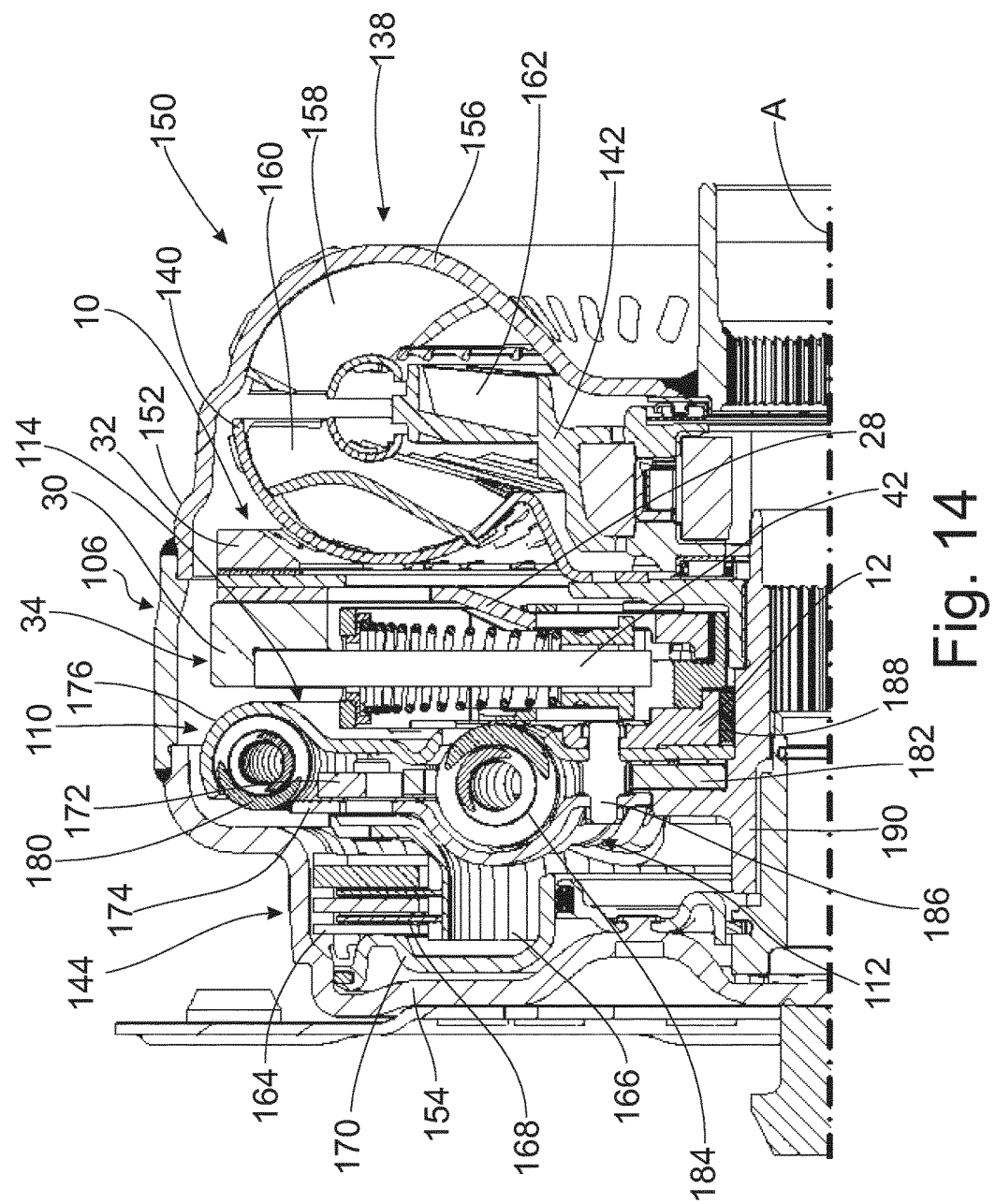
FIG. 14 is an installation situation of a torsional vibration damping arrangement.

FIG. 14 shows a constructive layout of a starting element with a hydrodynamic torque converter 150 in fragmentary longitudinal section. The housing 152 thereof provides a rotating wet space 106 and comprises a drive-side housing shell 154 and an output-side housing shell 156 which also simultaneously forms an impeller shell and carries at its inner side a plurality of impeller blades 158 successively in circumferential direction around the axis of rotation A. The turbine 140 with turbine blades 160 is axially opposed to the impeller 138 provided in this way. The stator 142 with stator blades 162 is located between the impeller 138 and turbine 140.

The lockup clutch 144 comprises drive-side friction elements or plates 164, which are coupled to rotate with the drive-side housing shell 154, and output-side friction elements or plates 168 which are coupled to rotate with a friction element carrier 166. The latter can be pressed together by a clutch piston 170 for torque transmission and for engaging the lockup clutch 144. The torsional vibration damper 110 which is downstream of the lockup clutch 144 in the torque path and positioned here on the radially outer side comprises as primary side a central disk element 172 coupled with the friction element carrier 166. Located axially on both sides of the latter are cover disk elements 174, 176, the radially outer region of which essentially provides the secondary side of the torsional vibration damper 110. A torque is transmitted between the central disk element 172, i.e., the primary side, and the cover disk elements 174, 176, i.e., the secondary side, through damper springs 180 of the torsional vibration damper 110.

The radially inner area of the cover disk elements 174, 176 forms a primary side of the second torsional vibration damper 112 which is positioned radially inwardly. A further central disk element 182 which essentially provides a secondary side of the further torsional vibration damper 112 is located axially between these cover disk elements which are fixedly connected to one another and is coupled with the cover disk elements 174, 176 through damper springs 184 for torque transmission.

The two cover disk elements 174, 176 also essentially provide the intermediate mass arrangement 114 to which the carrier 12 of a torsional vibration damping arrangement 10 constructed according to the invention is connected, for example, by bolts 186 which also fixedly connect the two cover disk elements 174, 176 to one another. The flywheel mass 34 of the torsional vibration damping arrangement 10 comprises the two mass rings 30, 32 and the carrier disk 28 and is located axially substantially between the two radially staggered torsional vibration dampers 110, 112 and the turbine 140. Owing to the shape of the mass ring 32 with radially inwardly angled contour, this mass ring 32 can be positioned so as to axially overlap the turbine 140, which allows an axially compact constructional size.

The two arrangements described in the preceding paragraphs as independent torsional vibration dampers 110 and 102 which are arranged one behind the other can also be regarded from an equivalent perspective as a sole two-stage torsional vibration damper having a primary side formed by the central disk element 172 and a secondary side formed by the further central disk element 182. The arrangement viewed as a two-stage torsional vibration damper has a first spring arrangement and a second spring arrangement, or damper springs 180 and 184. As intermediate element, the cover disk elements 174 and 176 are rotatable with respect to the primary side 172 against the restoring action of the first spring arrangement 180, and the secondary side 182 is rotatable with respect to the intermediate element 174, 176 against the restoring force of the second spring arrangement 184.

Of course, a sole one-stage torsional vibration damper, i.e., an arrangement in which a secondary side is rotatable with respect to the primary side against the restoring action of a sole spring arrangement, can also be used in further starting elements It will be seen that the carrier 12 is rotatably mounted on the radially inner side via a bearing 188, for example, a friction bearing or rolling element bearing, on an output hub 190 of the torsional vibration damping arrangement 10 connected to the further central disk element 182. The turbine 140 is also connected to this output hub 190, for example, by a toothed engagement, so as to rotate together with it such that the torque transmitted via the turbine is transmitted into the output hub 190 while circumventing the two torsional vibration dampers 110, 112 operating in series. Alternatively, as has already been stated, the turbine 140 could be coupled to the carrier 12 or, generally, the intermediate mass 114 or to the deflection mass 34 in order to increase the mass inertia thereof.

Although the discussion herein has been directed primarily to the drivetrain of a passenger car, it will be appreciated that embodiment examples of torsional vibration damping arrangements can also be utilized in any other rotating systems, for example, of agricultural machinery, trucks or stationary units.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement for a drivetrain of a vehicle, comprising:
   a carrier arrangement that is rotatable around an axis of rotation;
   a deflection mass which is movable in a circumferential direction relative to the carrier arrangement;
   at least one radially extending, elastically deformable restoring element configured to couple the carrier arrangement and the deflection mass to be rotatable relative to one another;
   a supporting element associated with the restoring element that is movable radially relative to the restoring element and configured to support the restoring element in circumferential direction with respect to the carrier arrangement at a radial position of the supporting element,
   wherein a stiffness of the coupling between the carrier arrangement and the deflection mass in circumferential direction due to a shape of the restoring element has an abrupt course at at least one radial position of the supporting element.

2. The torsional vibration damping arrangement according to claim 1, wherein the support of the restoring element with respect to the carrier arrangement is canceled at the radial position of the supporting element.

3. The torsional vibration damping arrangement according to claim 1, wherein a stiffness of the coupling within a radially inner first region of positions of the supporting element is lower than in a second region of positions adjoining the first region of positions that is farther radially outward, wherein the stiffness of the coupling abruptly increases at a transition from the first region to the second region.

4. The torsional vibration damping arrangement according to claim 3, wherein the stiffness of the coupling is lower inside a third region of positions of the supporting element adjoining the second region radially outwardly of the second region than in the second region, wherein the stiffness of the coupling decreases abruptly at the transition from the second region to the third region.

5. The torsional vibration damping arrangement according to claim 4, wherein the supporting element has a first circumferential supporting region for supporting the restoring element in circumferential direction and a second circumferential supporting region for supporting the restoring element opposite to the circumferential direction,
   wherein the first circumferential supporting region in the first region of positions of the supporting element is transferred out of an active position effecting a support in circumferential direction into an inactive position.

6. The torsional vibration damping arrangement according to claim 5,
   wherein a guide for the supporting element is arranged at the carrier arrangement, and
   wherein a cross section of the guide widens in circumferential direction in the first region of positions.

7. The torsional vibration damping arrangement according to claim 6,
   wherein an articulated part of the supporting element comprising the first circumferential supporting region is swivelable with respect to a fixed part of the supporting element comprising the second circumferential supporting region and is acted upon with respect to the fixed part by a relative force acting in circumferential direction.

8. The torsional vibration damping arrangement according to claim 3, wherein an extension of the restoring element in circumferential direction in the first region of positions of the supporting element is smaller than in the second region of positions.

9. The torsional vibration damping arrangement according to claim 8, wherein the extension of the restoring element in circumferential direction is smaller in the third region of positions of the supporting element than in the second region.

10. The torsional vibration damping arrangement according to claim 9, wherein an axial extension of the restoring element in at least one of the first region and the third region is increased relative to that in the second region such that an area moment of inertia of the restoring element in the second region corresponds to that in the at least one of the first region and the third region.

11. The torsional vibration damping arrangement according to claim 3, wherein a cross section of the restoring element along a radial extension thereof is constant, wherein a plate is arranged in the second region of positions on at least one side of the restoring element facing in circumferential direction, which plate is dimensioned such that in the second region the restoring element is supported via the plate at the radial position of the supporting element in circumferential direction with respect to the carrier arrangement.

12. The torsional vibration damping arrangement according to claim 11, wherein the plate extends around a radially inner end of the restoring element and is secured thereto by one of frictional engagement, positive engagement, and bonding engagement.

13. The torsional vibration damping arrangement according to claim 3, wherein the restoring element comprises a first partial element and a second partial element that are coupled with a radially outer deflection mass so as to be fixed with respect to rotation relative to it, wherein the first partial element extends radially inward through the first region, and wherein the second partial element extends radially inward as far as a boundary between the first region and second region.

14. The torsional vibration damping arrangement according to claim 1, wherein a stiffness of the coupling is higher in a radially inner first region of positions of the supporting element than in an adjoining second region of positions located farther radially outward, wherein the stiffness of the coupling abruptly decreases at a transition from the first region to the second region.

15. The torsional vibration damping arrangement according to claim 14, wherein the stiffness of the coupling in a third region of positions of the supporting element that adjoins the second region and is located radially outwardly of the second region is higher than in the second region, wherein the stiffness of the coupling increases abruptly at the transition from the second region to a third region.

16. The torsional vibration damping arrangement according to claim 14, wherein an extension of the restoring element in circumferential direction in the first region of positions of the supporting element is greater than in the second region of positions.

17. The torsional vibration damping arrangement according to claim 15, wherein an extension of the restoring element in circumferential direction in the third region of positions of the supporting element is greater than in the second region.

18. The torsional vibration damping arrangement according to claim 17, wherein an axial extension of the restoring element in the second region is increased relative to that in at least one of the first region and the third region such that an area moment of inertia of the restoring element in the second region corresponds to that in the at least one of the first region and the third region.

19. The torsional vibration damping arrangement according to claim 1, wherein the supporting element is acted upon opposite to the radial direction by a preloading force and is movable outward in the radial direction under an influence of centrifugal force.

20. The torsional vibration damping arrangement according to claim 1, wherein the restoring element comprises a restoring spring, configured as one of a leaf spring and a bar spring that is elastically deformable in circumferential direction.

21. The torsional vibration damping arrangement according to claim 1, further comprising:
a plurality of radially extending, elastically deformable restoring elements by which the carrier arrangement and the deflection mass are coupled so as to be rotatable relative to one another,
wherein a first supporting element is associated with at least one first restoring element of a first switching type that is movable radially relative to the first restoring element, by which first supporting element the first restoring element is supported in circumferential direction with respect to the carrier arrangement at a radial position of the first supporting element,
wherein a stiffness of the coupling between the carrier arrangement and the deflection mass which is brought about in circumferential direction by the first restoring element has a discontinuous course at least one radial position of the first supporting element; and
a second supporting element is associated with at least one second restoring element of a second switching type that is movable radially relative to the second restoring element, by which second supporting element the second restoring element is supported opposite to circumferential direction with respect to the carrier arrangement at a radial position of the second supporting element,
wherein a stiffness of the coupling between the carrier arrangement and the deflection mass brought about opposite to the circumferential direction by the second restoring element has a discontinuous course at least one radial position of the second supporting element,
wherein the at least one radial position of the first supporting element and the at least one radial position of the second supporting element correspond to one another.

22. The torsional vibration damping arrangement according to claim 21, wherein a quantity of restoring elements of the first switching type corresponds to a quantity of restoring elements of the second switching type.

23. The torsional vibration damping arrangement according to claim 22, wherein an identical number of restoring elements of the first switching type and of the second switching type are coupled with a common deflection mass.

24. The torsional vibration damping arrangement according to claim 23, wherein all of the restoring elements are coupled with a common deflection mass.

25. A drivetrain for a vehicle, comprising at least one torsional vibration damping arrangement comprising:
a carrier arrangement that is rotatable around an axis of rotation;
a deflection mass which is movable in a circumferential direction relative to the carrier arrangement;
at least one radially extending, elastically deformable restoring element configured to couple the carrier arrangement and the deflection mass to be rotatable relative to one another;
a supporting element associated with the restoring element that is movable radially relative to the restoring element and configured to support the restoring element in circumferential direction with respect to the carrier arrangement at a radial position of the supporting element,
wherein a stiffness of the coupling between the carrier arrangement and the deflection mass in circumferential direction due to a shape of the restoring element has an abrupt course at at least one radial position of the supporting element.

26. The drivetrain according to claim 25, wherein the drivetrain has a starting element, configured as one of a hydrodynamic torque converter, a fluid clutch, a wet friction clutch, and a dry friction clutch,
wherein the at least one torsional vibration damping arrangement is provided in a region of the starting element.

27. The drivetrain according to claim 26, further comprising:

at least one torsional vibration damper with a primary side and a secondary side that is rotatable with respect to the primary side against a restoring action of a spring arrangement, wherein the carrier arrangement of the at least one torsional vibration damping arrangement is connected to the secondary side of the torsional vibration damper to be fixed with respect to rotation relative to it.

28. The drivetrain according to claim 27, wherein the at least one torsional vibration damper has a first spring arrangement and a second spring arrangement, wherein an intermediate element is rotatable with respect to the primary side against the restoring action of the first spring arrangement and the secondary side is rotatable with respect to the intermediate element against the restoring action of the second spring arrangement.

29. The drivetrain according to claim 28, wherein the carrier arrangement of the at least one torsional vibration damping arrangement is connected to the intermediate element of the torsional vibration damper so as to be fixed with respect to rotation relative to it.

30. The drivetrain for a vehicle according to claim 25, wherein the driving is effected by a combustion engine with cylinder cutout.

* * * * *